US010554166B2

United States Patent
Cohen et al.

(10) Patent No.: US 10,554,166 B2
(45) Date of Patent: Feb. 4, 2020

(54) ELECTROSTATIC PARALLEL PLATE ACTUATORS WHOSE MOVING ELEMENTS ARE DRIVEN ONLY BY ELECTROSTATIC FORCE AND METHODS USEFUL IN CONJUNCTION THEREWITH

(71) Applicant: AUDIO PIXELS LTD., Rehovot (IL)

(72) Inventors: Yuval Cohen, Rehovot (IL); Shay Kaplan, Givat Ela (IL); Daniel Lewin, Ramat HaSharon (IL); Meir Ben Simon, Givat Ela (IL); Eric Andreas Haber, Kibbutz Kfar Menahem (IL)

(73) Assignee: AUDI PIXELS LTD., Rehovot (IL)

( * ) Notice: Subject to any disclaimer, the term of this patent is extended or adjusted under 35 U.S.C. 154(b) by 527 days.

(21) Appl. No.: 15/179,285

(22) Filed: Jun. 10, 2016

(65) Prior Publication Data

US 2016/0294318 A1 Oct. 6, 2016

Related U.S. Application Data

(63) Continuation of application No. 13/634,110, filed as application No. PCT/IL2011/000226 on Mar. 11, 2011, now Pat. No. 9,391,541.
(Continued)

(51) Int. Cl.
*H02N 1/00* (2006.01)
*H02P 31/00* (2006.01)
(Continued)

(52) U.S. Cl.
CPC ............. *H02P 31/00* (2013.01); *H02N 1/002* (2013.01); *H04R 3/002* (2013.01); *H04R 3/007* (2013.01);
(Continued)

(58) Field of Classification Search
CPC .......... H04R 1/005; H04R 3/06; H04R 19/00; H04R 19/013; H04R 29/002; H04R 3/002;
(Continued)

(56) References Cited

U.S. PATENT DOCUMENTS 4,131,363 A  12/1978  Shea et al.
4,194,095 A   3/1980  Doi et al.
(Continued)

FOREIGN PATENT DOCUMENTS

CN  1575037 A   2/2005
CN  1709587 A  12/2005
(Continued)

OTHER PUBLICATIONS

Dec. 26, 2014 Office Action issued in U.S. Appl. No. 13/737,526.
(Continued)

*Primary Examiner* — Quyen P Leung
*Assistant Examiner* — Eric Johnson
(74) *Attorney, Agent, or Firm* — Oliff PLC

(57) ABSTRACT

Actuator apparatus for generating a physical effect, at least one attribute of which corresponds to at least one characteristic of a digital input signal sampled periodically in accordance with a sampling clock, the apparatus comprising at least one actuator device, each actuator device including an array of moving elements, wherein each individual moving element is operative to be constrained to travel alternately back and forth along a respective axis responsive to an individual first electrostatic force operative thereupon, wherein each moving element has an at-rest position and is driven away from its at rest position solely by the first electrostatic force; and at least one electrode operative to apply a controlled temporal sequence of potential differences with at least one individual moving element from
(Continued)

among the array of moving elements thereby to selectably generate the first electrostatic force; and a controller operative to receive the digital input signal and to control at least one of the at least one electrode and the individual moving element to apply the sequence of potential differences.

5 Claims, 17 Drawing Sheets

Related U.S. Application Data

(60) Provisional application No. 61/312,797, filed on Mar. 10, 2010.

(51) Int. Cl.
| | | |
|---|---|---|
| *H04R 3/00* | (2006.01) | |
| *H04R 19/00* | (2006.01) | |
| *H04R 29/00* | (2006.01) | |
| *H04R 3/12* | (2006.01) | |
| *H04R 1/40* | (2006.01) | |
| *H04R 1/00* | (2006.01) | |
| *H04R 19/02* | (2006.01) | |

(52) U.S. Cl.
CPC ............ *H04R 3/12* (2013.01); *H04R 19/005* (2013.01); *H04R 29/002* (2013.01); *H04R 1/005* (2013.01); *H04R 1/403* (2013.01); *H04R 19/02* (2013.01); *H04R 2201/003* (2013.01); *H04R 2201/401* (2013.01); *Y10T 29/49002* (2015.01)

(58) Field of Classification Search
CPC .... H04R 3/007; H04R 19/005; H04R 23/006; H04R 3/12; H02N 1/006; H02N 1/002; H02P 31/00
USPC ........ 310/309, 308; 381/113, 116, 174, 175, 381/191
See application file for complete search history.

(56) References Cited

U.S. PATENT DOCUMENTS

| | | | |
|---|---|---|---|
| 4,337,379 A | 6/1982 | Nakaya | |
| 4,515,997 A | 5/1985 | Stinger, Jr. | |
| 5,046,101 A | 9/1991 | Lovejoy | |
| 5,517,570 A | 5/1996 | Taylor | |
| 5,574,792 A | 11/1996 | Konno | |
| 5,580,639 A | 12/1996 | Togawa et al. | |
| 5,953,200 A | 9/1999 | Haley et al. | |
| 6,094,116 A | 7/2000 | Tai et al. | |
| 6,125,189 A | 9/2000 | Yasuno et al. | |
| 6,182,941 B1* | 2/2001 | Scheurenbrand | F15C 5/00 137/554 |
| 6,289,106 B1 | 9/2001 | Wong | |
| 6,373,955 B1 | 4/2002 | Hooley | |
| 6,403,995 B2 | 6/2002 | Thomas | |
| 6,795,561 B1 | 9/2004 | Bank | |
| 6,959,096 B2 | 10/2005 | Boone et al. | |
| 6,963,654 B2 | 11/2005 | Sotme et al. | |
| 6,975,740 B2 | 12/2005 | Rautio et al. | |
| 7,016,186 B2 | 3/2006 | Ueda et al. | |
| 7,286,681 B2 | 10/2007 | Gerkinsmeyer | |
| 8,085,964 B2 | 12/2011 | Cohen et al. | |
| 8,126,163 B2 | 2/2012 | Cohen et al. | |
| 8,374,056 B2 | 2/2013 | Cohen et al. | |
| 8,457,338 B2 | 6/2013 | Cohen et al. | |
| 2001/0048123 A1 | 12/2001 | Thomas | |
| 2002/0073856 A1 | 6/2002 | Davis et al. | |
| 2002/0106093 A1 | 8/2002 | Azima et al. | |
| 2002/0151171 A1 | 10/2002 | Furusawa | |
| 2003/0068054 A1 | 4/2003 | Sotme et al. | |
| 2003/0129814 A1 | 7/2003 | Mizukoshi | |
| 2003/0161483 A1 | 8/2003 | Byers | |
| 2004/0122543 A1 | 6/2004 | Lee et al. | |
| 2005/0008165 A1 | 1/2005 | Sack et al. | |
| 2005/0008171 A1 | 1/2005 | Hosoi et al. | |
| 2005/0180577 A1 | 8/2005 | Horbach | |
| 2005/0207588 A1 | 9/2005 | Biegelsen | |
| 2005/0281419 A1 | 12/2005 | Miyazaki et al. | |
| 2006/0145059 A1 | 7/2006 | Lee et al. | |
| 2006/0255993 A1 | 11/2006 | Miki et al. | |
| 2010/0002900 A1 | 1/2010 | Cohen et al. | |
| 2010/0166242 A1 | 7/2010 | Cohen et al. | |
| 2010/0316242 A1 | 12/2010 | Cohen et al. | |
| 2011/0108933 A1* | 5/2011 | Nakatani | B81C 1/00238 257/415 |
| 2012/0076330 A1 | 3/2012 | Cohen et al. | |

FOREIGN PATENT DOCUMENTS

| | | | | |
|---|---|---|---|---|
| EP | 0 437 999 A2 | 7/1991 | | |
| EP | 1 063 866 A1 | 12/2000 | | |
| EP | 1063866 A1 * | 12/2000 | ............ | H04R 1/005 |
| EP | 1 065 725 A2 | 1/2001 | | |
| EP | 1 465 211 A2 | 10/2004 | | |
| EP | 1 653 614 A1 | 5/2006 | | |
| GB | 1 106 750 A | 3/1968 | | |
| GB | 2 393 601 A | 3/2004 | | |
| JP | 51-120710 A | 10/1976 | | |
| JP | S57-23387 A | 2/1982 | | |
| JP | 57-185790 A | 11/1982 | | |
| JP | H09-98092 A | 4/1997 | | |
| JP | H09-266599 A | 10/1997 | | |
| JP | 2001-016675 A | 1/2001 | | |
| JP | 2005-087929 A | 4/2005 | | |
| JP | 2006-319535 A | 11/2006 | | |
| JP | 2010-028211 A | 2/2010 | | |
| JP | 05-014992 B2 | 8/2012 | | |
| NL | 6613713 A | 4/1968 | | |
| WO | 84/00460 A1 | 2/1984 | | |
| WO | 96/31086 A1 | 10/1996 | | |
| WO | 98/24544 A1 | 6/1998 | | |
| WO | 99/08479 A1 | 2/1999 | | |
| WO | WO-9908479 A1 * | 2/1999 | ............ | H04R 1/403 |
| WO | 01/23104 A2 | 4/2001 | | |
| WO | 01/87458 A1 | 11/2001 | | |
| WO | 03/059005 A2 | 7/2003 | | |
| WO | 03/061343 A2 | 7/2003 | | |
| WO | 2007/135678 A2 | 11/2007 | | |
| WO | 2007/135679 A2 | 11/2007 | | |
| WO | 2007/135680 A1 | 11/2007 | | |
| WO | 2009/066290 A2 | 5/2009 | | |
| WO | WO-2009066290 A2 * | 5/2009 | ............ | H02K 41/03 |
| WO | WO-2010004766 A1 * | 1/2010 | ......... | B81C 1/00238 |

OTHER PUBLICATIONS

Lagorce, L. K. and M. G. Allen, "Magnetic and Mechanical Properties of Micro-machined Strontium FerritelPolyimide Composites", IEEE Journal of Micro-electromechanical Systems, vol. 6, No. 4, Dec. 1977.

Lagorce, L K., Brand, O. and M. G. Allen, "Magnetic microactuators based on polymer magnets", IEEE Journal of Microelectromechanical Systems, vol. 8, No. 1, Mar. 1999.

BBE Sound, Inc., "DS48 Digital Speaker Processor", BBE Professional Products.

Diamond, A. M., et al. "Digital Sound Reconstruction using Arrays of CMOS-MEMS Microspeakers", Transducers, Solid-State Sensors, Actuators and Microsystems, 12th International Conference, Piscataway, NJ, US, IEEE, vol. 9, Jun. 9, 2003, p. 238-241.

Hawksford, M.O.J., "Smart Digital Loudspeaker Arrays", Journal of the Audio Engineering Society, New York, NY, US, vol. 51, No. 12, Dec. 2003, p. 1133-1162.

Huang, Y., et al., "Distortion and Directivity in a Digital Transducer Array Loudspeaker", Journal of the Audio Engineering Society, New York, NY, US, vol. 49, No. 5, May 2001, p. 337-352.

(56) References Cited

OTHER PUBLICATIONS

Meyer, D.G., "Digital Control of Loudspeaker Array Directivity", Journal of the Audio Engineering Society, New York, NY, US, vol. 32, No. 10, Oct. 1984, pp. 747-754.
Crocker, M.1., "Encyclopedia of Acoustics", Wiley-Interscience, Apr. 22, 1997.
Kinsler, L.E., et al., "Fundamentals of Acoustics".
Raichel, D.R., "The science and Applications of Acoustics".
Rossing, T. D., et al., "Principles of Vibration and Sound".
Fahy, F., "Foundations of Engineering Acoustics".
Neumann, J.1., Jr., "MEMS (Microelectromechanical Systems) Audio Devices-Dreams and Realities", Audio Engineering Society, Convention paper, Oct. 10-13, 2003.
Yamaha, "Multi-channel Surround Sound from a single component", Digital Sound Projections.
May 10, 2007 International Search Reports issued in PCT/IL2007/000622.
May 11, 2007 International Search Report issued in PCT/IL2007/000618.
Mar. 3, 2008 International Search Report issued in PCT/IL2007/000621.
Jun. 18, 2009 International Search Report issued in PCT/IL2008/001524.
Hawksford, M., "Spatial Distribution of Distortion and Spectrally Shaped Quantization Noise on Digital Micro-Array Loudspeakers", Journal of Audio Engineering Society, vol. 55, No. 1/2, Jan./Feb. 2007.

\* cited by examiner

ELECTROSTATIC PARALLEL PLATE ACTUATORS WHOSE MOVING ELEMENTS ARE DRIVEN ONLY BY ELECTROSTATIC FORCE AND METHODS USEFUL IN CONJUNCTION THEREWITH

This application is a Continuation of application Ser. No. 13/634,110 filed Sep. 11, 2012, which is based upon and claims the benefit of priority (priorities) from Provisional Application No. 61/312,797 filed Mar. 11, 2010 and International Patent Application No. PCT/IL2011/000226 filed Mar. 10, 2011, the entire contents of the prior applications being incorporated herein by reference.

FIELD OF THE INVENTION

The present invention relates generally to actuators and more particularly to speakers.

BACKGROUND OF THE INVENTION

A wide variety of actuators and speakers are known. Applicant's co-pending applications, some of which are published as indicated above, describe state of the art actuators such as speakers.

The term bearing as used herein is intended to include any device which allows constrained relative motion, such as bending motion, between parts e.g. a device which connects a moving element to stationary elements and defines the path of motion and the at-rest position of the moving element. A flexure bearing or flexure is a bearing which allows bending motion. A flexure bearing may comprise a flexible part joining two other parts and is typically simple, inexpensive, compact and low friction. Flexure bearings are typically formed of a material which can be repeatedly flexed without disintegrating. A spring is intended to include any suitable elastic member such as but not limited to a spirally coiled strip or wire that recovers its shape after compression, bending or stretching. Addressing of an (i,j)'th actuator element in an array of actuator elements refers to application of voltage between a particular row and a particular column of the array of actuator elements.

An array is termed herein an "active" array if its elements include an element drive circuit, and is termed herein a "passive" array if its elements do not include an element drive circuit.

The terms 'resting position', 'at-rest position' and 'at rest position' are used generally equivalently in the present specification. The terms 'actuator device' and 'actuating device' are used generally equivalently in the present specification.

State of the art loudspeaker arrays and control algorithms useful therefor are described in the following publications by Malcolm Hawksford:

A. "Spatial Distribution Of Distortion And Spectrally Shaped Quantization Noise In Digital Micro-Array Loudspeakers", J. Audio Engl Soc., Vol. 55, No. 1/2, 2007 January/February; and B. Smart Digital Loudspeaker Arrays", J. Audio Engl Soc., Vol. 51, No. 12, 2003 December.

It is appreciated that the terms "top" and "bottom" are used, when used, in the description or the drawings merely for convenience to indicate locations on either side of a surface defined by the array of moving elements such as the surface connecting the midpoints of the trajectories of the moving elements. Gravity, in many applications, is a negligible force such that a "top" location could equally well be disposed below or to the left or right of a "bottom" location.

The above terms may be construed either in accordance with any definition thereof appearing in the prior art literature or in accordance with the specification, or as above.

ANSYS Inc.'s Glossary of MEMS Terminology states that a dimple is "A small feature or bump, typically a raised square on the surface of a MEMS device. Dimples can be used as mechanical stops e.g. to control the touch down in a high aspect ratio device".

The disclosures of all publications and patent documents mentioned in the specification, and of the publications and patent documents cited therein directly or indirectly, are hereby incorporated by reference.

SUMMARY OF THE INVENTION

Certain embodiments of the present invention seek to provide moving elements traveling responsive to an individual first electro-static force operative thereupon, without involvement of electromagnetic forces, as opposed to actuator elements described in Applicant's co-pending applications which may be responsive to alternating magnetic fields or to an electromagnetic force operative thereupon and in which electrostatic force merely has a latching function.

The present invention typically includes at least the following embodiments:

1. Electrostatic parallel plate actuator apparatus for generating a physical effect, at least one attribute of which corresponds to at least one characteristic of a digital input signal sampled periodically, the apparatus comprising:

at least one electrostatic parallel plate actuator device, each actuator device including:

an array of conductive moving elements defining a first plane, wherein each individual moving element is operative to be constrained to travel alternately back and forth along a respective axis responsive to an individual first electrostatic force operative thereupon, wherein each moving element has an at-rest position and is driven away from its at rest position solely by the first electrostatic force; and at least one planar electrode defining a second plane generally parallel to the first plane, the planar electrode being operative to apply a controlled temporal sequence of potential differences with at least one individual moving element from among the array of moving elements thereby to selectably generate the first electrostatic force; and a controller operative to receive the digital input signal and accordingly to control at least one of the at least one electrode and the individual moving element to apply the sequence of potential differences Such that the physical effect represents the signal.

2. Apparatus according to embodiment 1 wherein the movement of at least an individual one of the moving elements along their respective axis is further constrained by at least one mechanical limiter disposed along the individual moving element's axis, the mechanical limiter defining an extreme position and preventing the moving element from moving beyond the extreme position.

3. Apparatus according to embodiment 2 and also comprising at least one latch operative to latch at least one of the moving elements by selectively preventing at least one of the moving elements, having reached one of the extreme positions, from moving away from the mechanical limiter back towards its previous position.

4. Apparatus according to embodiment 3 where the latching of the moving element is effected by means of a second electrostatic force generated by the electrode, the second electrostatic force acting in the same direction as the first electrostatic force.

5. Apparatus according to embodiment 2 where the mechanical limiter and the electrode are integrally formed.

6. Apparatus according to embodiment 2 having at least one protruding dimple disposed on at least one surface of the moving element and the mechanical limiter, producing a gap between the surfaces when the moving element is in the extreme position.

7. Apparatus according to embodiment 2 where the first electrostatic force described in embodiment 1 is adjusted in such a way as to limit the range of movement of the moving elements along their respective to a range shorter than that defined by the mechanical limiter.

8. Apparatus according to embodiment 1 wherein the controller controls the at least one electrode at regular time intervals thus defining an actuation clock frequency.

9. Apparatus according to embodiment 8 wherein the mechanical resonance frequency of the moving element is tuned to the actuation clock frequency.

10. Apparatus according to embodiment 8 wherein the mechanical resonance frequency of the moving element is lower than half of the actuation clock frequency.

11. Apparatus according to embodiment 8 wherein at least one characteristic of a digital input signal is sampled periodically in accordance with a sampling clock wherein the actuation clock frequency is an integer multiple of the sampling clock's frequency.

12. Apparatus according to embodiment 9 wherein the mechanical resonance frequency of the moving element is half of the actuation clock frequency.

13. Apparatus according to embodiment 4 wherein the first and second electrostatic forces have the same amplitude and polarity.

14. Apparatus according to embodiment 4 wherein the first and second electrostatic forces differ in at least one of amplitude and polarity.

15. Apparatus according to any of the embodiments 1-14, where at least one electrode extends across, and controls the movement of, more than one actuator element.

16. An actuation method for generating a physical effect, at least one attribute of which corresponds to at least one characteristic of a digital input signal sampled periodically, the method including providing at least one electrostatic parallel plate actuator device, each actuator device including:

an array of conductive moving elements defining a first plane, wherein each individual moving element is operative to be constrained to travel alternately back and forth along a respective axis responsive to an individual first electrostatic force operative thereupon, wherein each moving element has an at-rest position and is driven away from its at rest position solely by the first electrostatic force; and at least one planar electrode defining a second plane generally parallel to the first plane, the planar electrode being operative to apply a controlled temporal sequence of potential differences with at least one individual moving element from among the array of moving elements thereby to selectably generate the first electrostatic force; and using a controller to receive the digital input signal and accordingly to control at least one of the at least one electrode and the individual moving element to apply the sequence of potential differences such that the physical effect represents the signal.

17. Apparatus according to embodiment 1, wherein the at least one actuator device also includes:

a first plurality of electrical connections driven by the controller and arranged in a first geometric pattern, hereinafter referred to as "rows";

at least one further plurality of electrical connections also driven by the controller and arranged in at least one further geometric pattern which differs from the first geometric pattern, hereinafter referred to as "columns";

and a plurality of of element drive circuits;

wherein:

the first and further geometric patterns are designed such that each area where one row overlaps one column contains one moving element;

each of the element drive circuits controls one of the moving elements, and is electrically connected to one of the row and at least one of the columns;

enabling the controller to control the electrostatic force acting on each of the moving elements indirectly by driving the rows and the columns, which in turn determines the behaviour of the element drive circuits.

18. Electrostatic parallel plate actuator apparatus for generating a physical effect, at least one attribute of which corresponds to at least one characteristic of a digital input signal sampled periodically, the apparatus comprising:

at least one actuator device, each actuator device including:

an array of moving elements defining a first plane, wherein each individual moving element is operative to be constrained (a) to travel alternately back and forth along a respective axis responsive to a first electrostatic force operative thereupon; and (b) to be latched selectively into at least one latching position; and at least one planar electrode defining a second plane parallel to the first plane, the electrode being operative to apply a controlled temporal sequence of potential differences with at least one individual moving element from among the array of moving elements thereby to selectably generate the first electrostatic force; and a controller operative to receive the digital input signal and to control at least one of the at least one electrode and the individual moving element to apply the sequence of potential differences.

19. A method for electrostatic parallel plate actuation for generating a physical effect, at least one attribute of which corresponds to at least one characteristic of a digital input signal sampled periodically, the method including providing at least one actuator device, each actuator device including:

an array of moving elements defining a first plane, wherein each individual moving element is operative to be constrained (a) to travel alternately back and forth along a respective axis responsive to a first electrostatic force operative thereupon; and (b) to be latched selectively into at least one latching position; and at least one planar electrode defining a second plane parallel to the first plane, the electrode being operative to apply a controlled temporal sequence of potential differences with at least one individual moving element from among the array of moving elements thereby to selectably generate the first electrostatic force; and using a controller to receive the digital input signal and to control at least one of the at least one electrode and the individual moving element to apply the sequence of potential differences.

20. Apparatus according to embodiment 1 wherein the array of moving elements comprises a first plurality of first groups of electrically interconnected moving elements arranged in a first geometric pattern;

wherein the at least one electrode comprises at least one array of electrodes divided into at least one second plurality of second groups of electrically interconnected electrodes arranged in at least one second geometric pattern which differs from the first geometric pattern;

wherein each of the first and second pluralities of groups is electrically connected to the controller, and the first and second geometric patterns are characterized in that each area where one first group overlaps one second group contains only one moving element and wherein the controller is operative to address each of the moving elements by controlling the electrostatic force acting on each of the moving elements within the array by applying voltage between an individual one of the first groups and an individual one of the second groups.

The first and second groups may for example comprise rows and columns however the configuration of each group need not necessarily be a straight line; the groups, e.g. rows and columns, may be configured at right angles to one another or at any other non-zero angle; and the angle between intersecting first and second groups need not be the same at each intersection between first and second groups. The number of moving elements per row may or may not be the same for each first group, e.g. row, and for each second group, e.g. column. If each moving element includes two electrodes per moving element, the two electrodes may optionally be arranged in two different patterns respectively.

21. Apparatus according to embodiment 20 wherein the actuating device includes a plurality of arrays, each having rows and columns which are not electrically connected to rows and columns, respectively, of other arrays within the actuating device.

22. Apparatus according to embodiment 20 wherein the rows and columns extend across more than one actuator device, such that rows include moving elements located within more than one actuator device and columns include electrodes located within more than one actuator device.

23. Apparatus according to embodiment 20 wherein, sequentially for each individual row in the array, the controller periodically (a) connects only the individual row to a predetermined electrical potential while keeping all other rows electrically floating and (b) addresses selected moving elements in the individual row.

In each such exclusively connected, also termed herein "selected", row the moving elements being addressed may comprise all the moving elements in the selected row, any subset of the moving elements in the selected row, a single moving element in the selected row, or no moving element at all. Multiple moving elements in the exclusively connected row may be addressed simultaneously or at different times while the row remains selected. Scanning may also be effected with rows and columns reversed. The controller may periodically "select" a column by connecting one column to a known electrical potential while keeping other columns electrically floating, address selected moving elements within the selected column, and repeats the process for each column.

24. Apparatus according to embodiment 4 wherein the controller releases at least one moving element from a latched state by electrically connecting the moving element to the electrode.

25. Apparatus according to embodiment 1 wherein the controller periodically refreshes electrical charge on the capacitor formed by the moving element and an electrode.

26. Apparatus according to embodiment 1 wherein the controller controls the electrostatic force acting on at least one of the moving elements by applying voltage between at least one of the electrodes and at least one of the moving elements for a predetermined period of charge time which terminates while the moving element is still in motion, thereafter preventing any transfer of electrical charge into and out of the capacitor formed by the at least one moving element and the at least one electrode.

27. Apparatus according to embodiment 1 and also comprising at least one position sensor sensing the position of at least one moving element along its respective axis.

28. Apparatus according to embodiment 27 wherein the position sensor comprises a capacitance sensor, sensing the capacitance between the moving element and an electrode.

29. Apparatus according to embodiment 26 and also comprising at least one position sensor sensing the position of at least one moving element along its respective axis.

30. Apparatus according to embodiment 27 wherein the controller uses information provided by the position sensor to detect defects in individual moving elements.

31. Apparatus according to embodiment 27 wherein position information provided by the position sensor is used to adjust the voltage applied between at least one moving element and at least one electrode.

32. Apparatus according to embodiment 29 wherein position information provided by the position sensor is used to adjust the charge time for the moving element.

33. Apparatus according to embodiment 27 wherein the controller uses position information provided by said position sensor when selecting moving elements to produce said physical effect.

34. Apparatus according to embodiment 29 wherein the position sensor comprises a capacitance sensor, sensing the capacitance between the moving element and an electrode and wherein the capacitance sensor comprises a voltage sensor operative to sense the voltage between a moving element and an electrode while at least one of the moving element and electrode are electrically floating.

35. Apparatus according to embodiment 34 wherein the voltage sensor comprises an analog comparator.

36. Apparatus according to embodiment 34 wherein the voltage sensor comprises an analog-to-digital converter.

37. Apparatus according to embodiment 18 wherein the moving elements are selectively latched into at least one latching positions by the at least one electrode.

38. Apparatus according to embodiment 18 wherein motion of at least an individual one of the moving elements is limited by at least one mechanical limiter disposed along the individual moving element's axis.

39. Apparatus according to embodiment 2 wherein the electrode comprises a mechanical limiter disposed along the individual moving element's axis which limiter is operative to limit the moving element.

40. Apparatus according to embodiment 1 wherein the moving elements are selectively latched by a first latch and a second latch to selectively latch at least one subset of the moving elements in corresponding first and second latching positions.

41. Apparatus according to embodiment 3 wherein each moving element has at least one extreme position defined, by the at least one mechanical limiter, along the axis and wherein at least one moving element is latched into the at least one extreme position.

42. Apparatus according to embodiment 3 wherein each moving element has at least one extreme position defined, by the at least one mechanical limiter, along the axis and wherein at least one moving element is latched into a location along the axis which falls short of the moving element's extreme position.

43. Apparatus according to embodiment 1 wherein the array of moving elements comprises a first plurality of rows of moving elements extending along a first geometrical dimension and electrically connected therebetween;

wherein the electrode comprises an array of electrodes parallel to the array of moving elements and comprising a second plurality of columns of electrodes which are non-parallel to the rows of moving elements arranged along a second geometrical dimension and electrically connected therebetween;

and wherein the controller is operative to determine that motion of an I,j'th element, comprising the j'th element in the I'th row from among the plurality of rows, is mandated in order to generate the physical effect and to cause motion of the I,j'th moving element by changing the voltage difference between the j'th column from among the plurality of columns and the I'th row.

44. Apparatus according to embodiment 43 wherein the voltage difference is changed by using a voltage source to apply voltage between the j'th column from among the second plurality of columns and the I'th row.

45. Apparatus according to embodiment 43 wherein the voltage difference is changed by short-circuiting the j'th column from among the second plurality of columns and the I'th row.

46. Apparatus according to embodiment 43 wherein the rows are perpendicular to the columns.

47. Apparatus according to embodiment 20 wherein the controller is operative to determine that motion of at least an a,b'th moving element and a c,d'th moving element is mandated in order to generate the physical effect and to cause motion of the moving elements by using a voltage source to apply voltage between the b'th column from among the second plurality of columns and the a'th row; disconnecting at least one of the a'th row and b'th column from the voltage source after a predetermined period of time, subsequently using the voltage source to apply voltage between the d'th column from among the second plurality of columns and the c'th row; and disconnecting at least one of the c'th row and d'th column from the voltage source after a predetermined period of time.

48. Apparatus according to embodiment 43 wherein the voltage is applied for a predetermined period of time after which at least one of the I'th row and j'th column are disconnected from the voltage source.

49. Apparatus according to embodiment 48 wherein the period of time terminates while the I,j'th moving element is still in motion.

If several moving elements are moved, these may be scanned one after the other by connecting the row and column of the first moving element to a voltage source, waiting for a period, disconnecting the row and column of the first element, then doing the same for the second moving element, and so on. If there are (say) 17 moving elements to be moved of which 3 (say) are in the same row, in columns (say) 1, 2, and 8, this row may be simultaneously connected with all 3 of the columns 1, 2, 8, rather than connecting the row in question with columns 1, 2 and 8 sequentially as described above. If all of the moving elements to be moved are in a single column, the single column may be connected to multiple rows in which the moving elements respectively reside.

50. Apparatus according to embodiment 43 and also comprising a position sensor sensing the position of the I,j'th element along the axis.

51. Apparatus according to embodiment 50 wherein the position sensor comprises a capacitance sensor.

52. Apparatus according to embodiment 51 wherein the voltage is applied for a predetermined period of time after which at least one of the I'th row and j'th column are disconnected from the voltage source, and wherein the period of time terminates while the I,j'th moving element is still in motion, wherein the capacitance sensor measures a change over time in the voltage difference between an I,j'th moving element and an I,j'th electrode.

The I,j'th electrode may comprise either that which the moving element is moving toward or that which the moving element is moving away from.

53. Apparatus according to embodiment 50 wherein position information provided by the position sensor is used to adjust the voltage of the voltage source.

54. Apparatus according to embodiment 50 wherein position information provided by the position sensor is used to adjust the duration of the period of time.

55. Apparatus according to embodiment 50 wherein if the position sensor detects that a moving element has an aberrant moving pattern, the controller marks the moving element as faulty and does not utilize the moving element further. An example of an aberrant moving pattern is when the moving element never reaches a predetermined location along its axis.

56. Apparatus according to embodiment 50 wherein if the position sensor detects differences between motion patterns of different moving elements, the position sensor deduces differences in at least one operational feature of the moving elements and takes the operational feature differences into account when selecting moving elements. The operational feature may for example comprise amounts of pressure generated by motion of the moving element responsive to a given electrostatic force.

57. Apparatus according to embodiment 38 wherein the mechanical limiter comprises at least one protruding dimple on at least one of the moving elements primary surfaces and the electrode primary surfaces. Primary=the surface that perpendicular to the axis 58. Apparatus according to embodiment 43 wherein the controller is operative to determine that motion of at least an a,b'th moving element and a c,b'th moving element is mandated in order to generate the physical effect and to cause motion of the moving elements by using a voltage source to apply voltage between the b'th column from among the second plurality of columns and the a'th and c'th rows; and disconnecting at least one of (i) both the a'th and c'th rows and (ii) the b'th column from the voltage source after a predetermined period of time.

59. Apparatus according to embodiment 43 wherein the controller is operative to determine that motion of at least an a,b'th moving element and an a', d'th moving element is mandated in order to generate the physical effect and to cause motion of the moving elements by using a voltage source to apply voltage between each of the b'th and d'th columns from among the second plurality of columns and the a'th row; and disconnecting at least one of (i) both the b'th and d'th columns and (ii) the a'th row from the voltage source after a predetermined period of time.

60. Apparatus according to embodiment 1 wherein the physical effect comprises sound and wherein the attribute comprises at least one of amplitude and frequency.

61. A method for manufacturing eElectrostatic parallel plate actuator apparatus for generating a physical effect, at least one attribute of which corresponds to at least one characteristic of a digital input signal sampled periodically, the method comprising:

providing at least one electrostatic parallel plate actuator device and a controller, each actuator device including:

an array of conductive moving elements defining a first plane, wherein each individual moving element is operative to be constrained to travel alternately back and forth along a respective axis responsive to an individual first electrostatic force operative thereupon, wherein each moving element has an at-rest position and is driven away from its at rest position solely by the first electrostatic force; and at least one planar electrode defining a second plane generally parallel to the first plane, the planar electrode being operative to apply a controlled temporal sequence of potential differences with at least one individual moving element from among the array of moving elements thereby to selectably generate the first electrostatic force;

the controller being operative to receive the digital input signal and accordingly to control at least one of the at least one electrode and the individual moving element to apply the sequence of potential differences Such that the physical effect represents the signal.

62. A method according to embodiment 61 wherein the providing at least one electrostatic parallel plate actuator device is effected using a MEMS process.

Any trademark occurring in the text or drawings is the property of its owner and occurs herein merely to explain or illustrate one example of how an embodiment of the invention may be implemented.

BRIEF DESCRIPTION OF THE DRAWINGS

Certain embodiments of the present invention are illustrated in the following drawings:

FIG. 2A shows the moving element in its resting position, with no voltage applied between the moving element and either electrode. FIG. 2B shows the moving element latched in one of its extreme positions. FIG. 2C shows the moving element latched in the other extreme position.

FIG. 3A shows the moving element in its resting position, with no voltage applied between the moving element and either electrode. FIG. 3B shows the moving element latched in one of its extreme positions. FIG. 3C shows the moving element latched in the other extreme position.

FIG. 4A shows the moving element in its resting position, with no voltage applied between the moving element and either electrode. FIG. 4B shows the moving element latched in one of its extreme positions, with the dimples 210 on one electrode 130 creating an air gap (240) between the moving element (120) and electrode 130. FIG. 4C shows the moving element latched in the other extreme position, with the dimples 220 on the other electode 140 creating an air gap (250) between the moving element (120) and electrode 140.

FIG. 14 is a simplified schematic diagram of a "super-array" comprising multiple actuator arrays (611, 612, 613 and 614) wherein one electrical connection in the controller controls each of the p rows of all arrays in the first row of the super-array, one electrical connection in the controller controls each of the p rows of all arrays in the second row of the super-array, and so on.

DETAILED DESCRIPTION OF CERTAIN EMBODIMENTS

Figure 1:
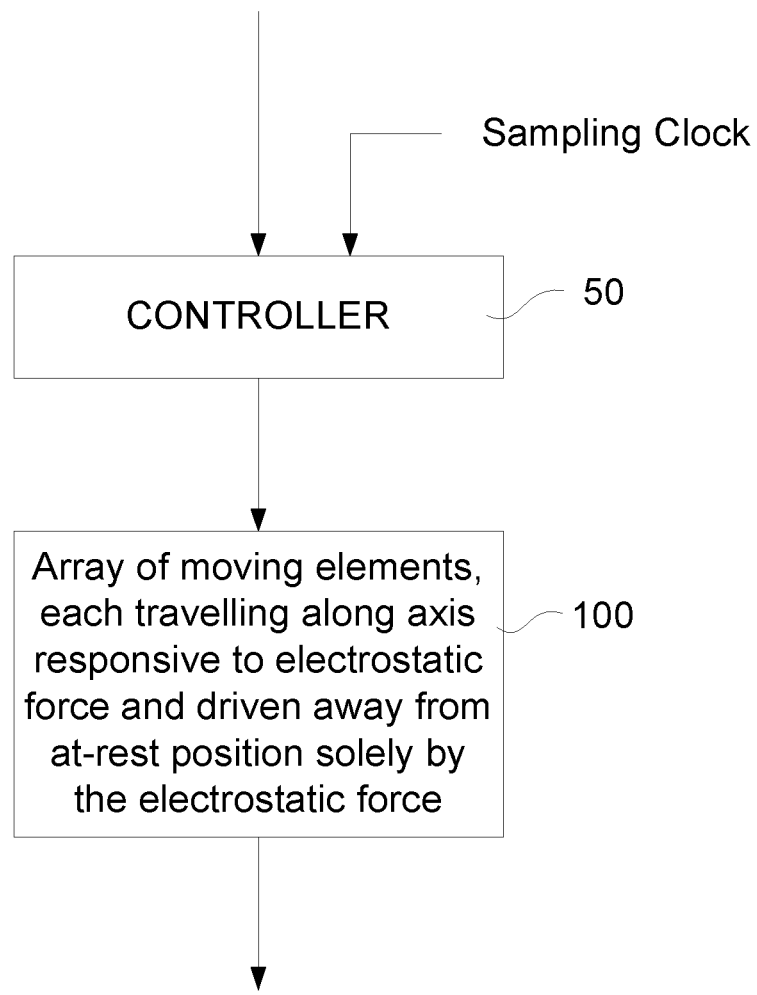
FIG. 1 is a simplified functional block diagram of actuator apparatus constructed and operative in accordance with certain embodiments of the present invention.

FIG. 1 is a simplified functional block diagram of actuator apparatus constructed and operative in accordance with certain embodiments of the present invention. The apparatus of FIG. 1 is operative to generate a physical effect, at least one attribute of which corresponds to at least one characteristic of a digital input signal sampled periodically in accordance with a sampling clock. It includes at least one actuator array 100 comprising a plurality of actuator elements, e.g. as shown in FIGS. 2A-5, and a controller 50 operative to receive the digital input signal and to control the actuator elements within the actuator array. Each actuator element may include a moving element and associated bearing, an electrode and spacer between the electrode and moving element, and optionally, mechanical limiters of the moving element's motion and/or dimples and/or an element drive circuit, all as shown and described herein.

Figure 2A:
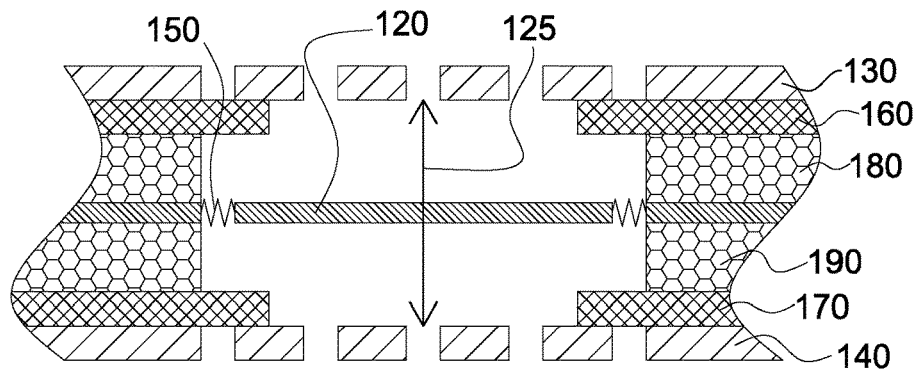
FIGS. 2A, 2B and 2C are cross-sectional illustrations of an individual actuator element in the apparatus of FIG. 1, constructed and operative in accordance with certain embodiments of the present invention.
Figure 2B:
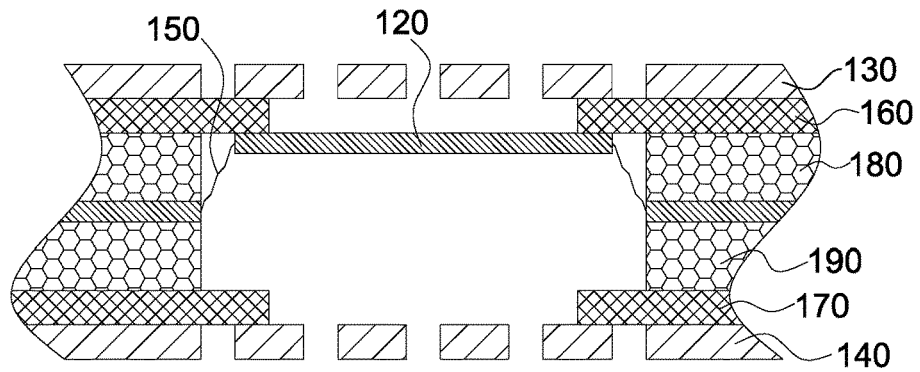
Figure 2C:
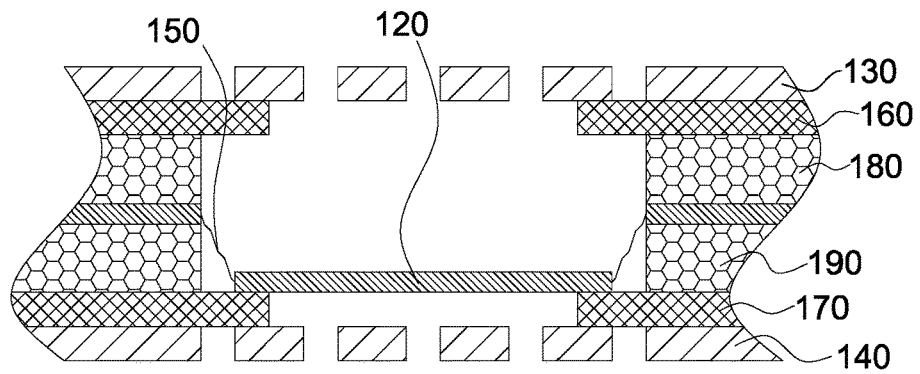

FIGS. 2A, 2B and 2C are cross-sectional illustrations of a two-sided actuator element constructed and operative in accordance with certain embodiments of the present invention. The actuator element includes a moving element 120 mechanically connected to the stationary portions of the actuator element by means of a suitable bearing 150 such as a flexure or spring. The bearing 150 defines an axis 125 along which the moving element 120 can travel, prevents the moving element 120 from travelling in other directions, and defines an at-rest position of the moving element 120. The actuator element further comprises two electrodes 130 and 140 disposed on opposite sides of the moving element 120. Depending on the digital input signal, the controller 50 of FIG. 1 (not shown here) may apply voltage between the moving element and either electrode, thus generating an electrostatic force to drive the moving element away from its at-rest position and towards the respective electrode. A pair of mechanical limiters 160 and 170 typically limit the motion of the moving element 120 along axis 125 in either direction. The moving element 120 is separated from the limiters 160 and 170 by spacers 180 and 190.

FIG. 2A shows the moving element 120 in its resting position, with no voltage applied between the moving element 120 and either electrode 130 and 140. FIG. 2B shows the moving element latched in one of two extreme positions. FIG. 2C shows the moving element latched in the other extreme position.

Figure 3A:
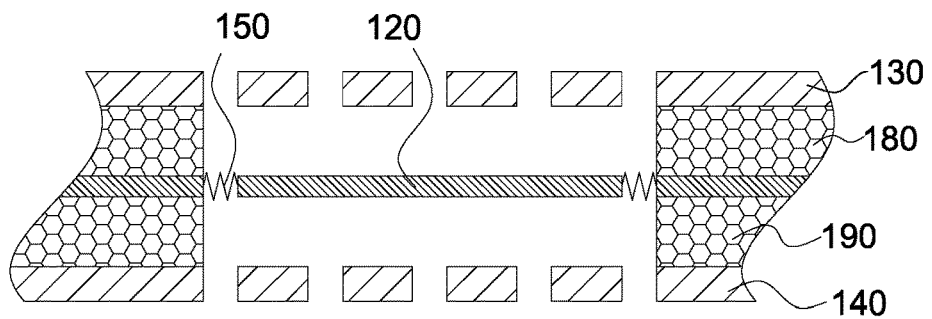
FIGS. 3A, 3B and 3C are cross-sectional illustrations of an individual actuator element in the apparatus of FIG. 1, constructed and operative in accordance with certain embodiments of the present invention, including one moving element (120) suspended by a bearing (150), with two electrodes (130 and 140) disposed on opposite sides, where each electrode also serves as a mechanical limiter. The moving element is separated from the electrodes by two spacers (180 and 190).
Figure 3B:
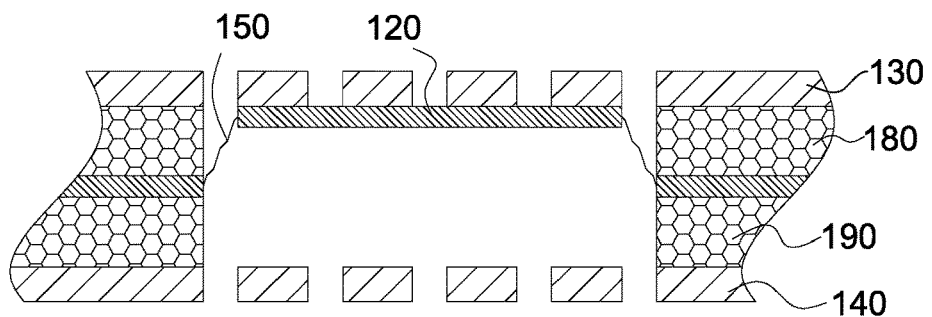
Figure 3C:
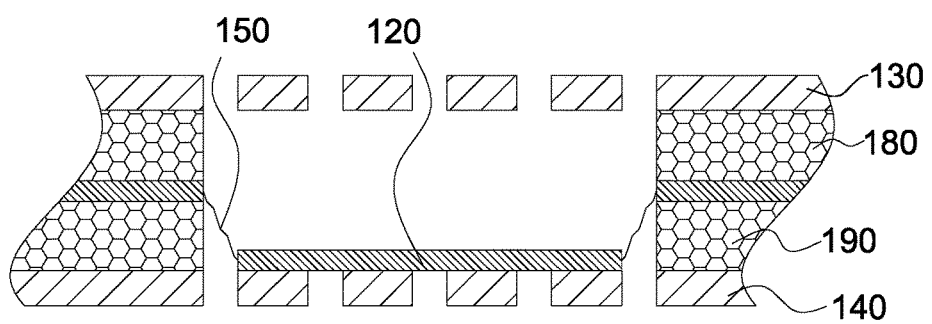

FIGS. 3A, 3B and 3C are cross-sectional illustrations of an actuator element which is similar to the actuator element of FIGS. 2A-2C except that the separately formed mechanical limiters 160 and 170 of FIGS. 2A-2C are omitted and electrodes 130 and 140 each serve also as a mechanical limiter. This embodiment relies on passivation, such as the native oxide layer present on silicon surfaces exposed to air, to prevent electrical short circuits between the moving element and either electrode. Alternatively, non-native passivation layers may also be added during one of the manufacturing process steps. FIG. 3A shows the moving element in its resting position, with no voltage applied between the moving element and either electrode. FIG. 3B shows the moving element latched in one of its extreme positions. FIG. 3C shows the moving element latched in the other extreme position.

A particular advantage of this embodiment is that the manufacturing process is typically simpler and more cost-effective than the manufacturing process for an actuator element according to FIGS. 2A-2C.

Figure 4A:
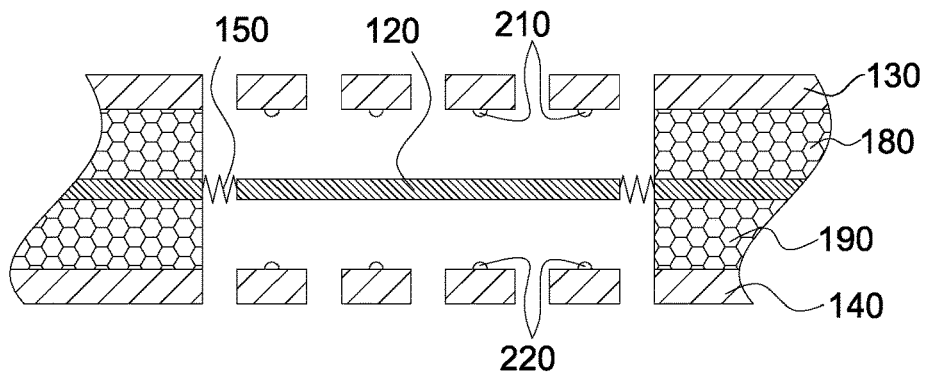
FIGS. 4A, 4B and 4C are cross-sectional illustrations of an individual actuator element in the apparatus of FIG. 1, constructed and operative in accordance with certain embodiments of the present invention, including one moving element (120) suspended by a bearing (150), and two electrodes (130 and 140) disposed on opposite sides, and protruding dimples (210 and 220) on the surface of each electrode.
Figure 4B:
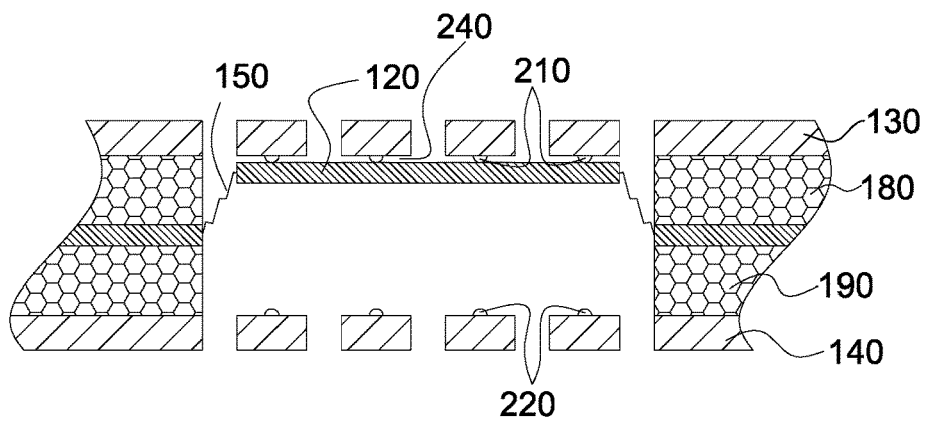
Figure 4C:
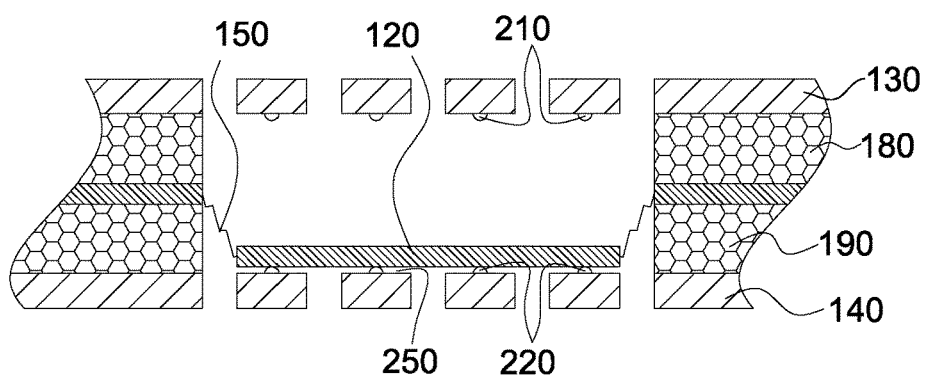

FIGS. 4A, 4B and 4C are cross-sectional illustrations of an actuator element which is similar to the apparatus of FIGS. 3A-3C except that dimples 210 and 220 are formed on the surfaces of the electrodes 130 and 140 respectively which each face the moving element 120. As a result, when the moving element 120 is in one of its extreme positions, it does not come into contact with the entirety of the facing surfaces of electrodes 130 or 140 and instead comes into contact only with the dimples 210 or 220 formed on electrodes 130 or 140 respectively thereby to form a gap such as an air gap 240. It is appreciated that the term "air gap" is used herein merely by way of example since the apparatus of the present invention normally operates in air however this need not be the case and alternatively, for example, the apparatus may operate in any other suitable medium.

It is also appreciated that the dimples can be formed on the surface of the moving element 120 instead of the electrodes 210 and 220.

A particular advantage of this embodiment is that releasing moving elements 120 from their extreme positions is typically easier than it would be e.g. in the embodiment of FIGS. 3A-3C because the air gaps 240 and 250 allow air to quickly flow into the space between the moving elements and the electrodes and/or because the dimples 210 and 220 prevent overly strong engagement e.g. due to squeeze film effects. This may also be the case for the embodiment of FIGS. 2A-2C however, manufacturing of dimples is typically simpler and more cost effective than manufacturing of a separate mechanical limiter layer. FIG. 4A shows the moving element in its resting position, with no voltage applied between the moving element and either electrode. FIG. 4B shows the moving element latched in one of its extreme positions. FIG. 4C shows the moving element latched in the other extreme position.

Figure 5:
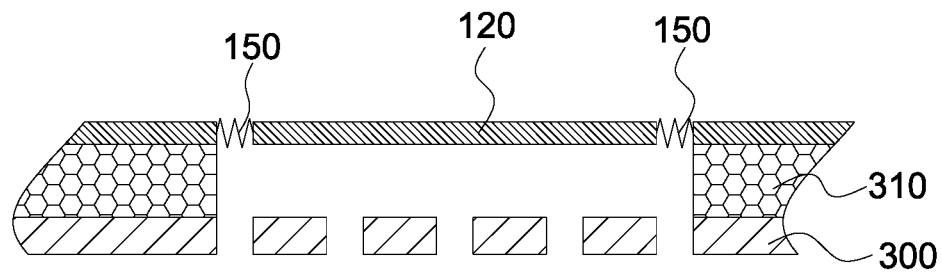
FIG. 5 is a cross-sectional illustration of an actuator device, showing one individual moving element (120) suspended by a bearing (150), with a single electrode (300) which also serves as a mechanical limiter. The moving element is separated from the electrode (300) by a single spacer (310).

FIG. 5 is a cross-sectional illustration of a one-sided actuator element constructed and operative in accordance with certain embodiments of the present invention. The actuator element is generally similar to the actuator element of FIG. 3A and also shown in its at rest position; however, unlike FIG. 3A, is one-sided in that it comprises only a single electrode 300 and a single spacer 310, whereas in FIG. 3A as described above, a pair of electrodes and a corresponding pair of spacers are provided. It is appreciated that, similarly, a one-sided version of the actuator devices of FIGS. 2A-2C and 4A-4C may be provided. It is appreciated that orientation of the devices shown and described herein relative to the horizontal need not be as shown. So, for example, the apparatus of FIGS. 2A-2B may be disposed such that the layers are horizontal, as shown, or may for example be disposed such that the layers are vertical. Also, the apparatus of FIG. 5 may be set on its side or may be inverted, if desired, such that the electrode layer 300 is atop the moving element 120 rather than vice versa. According to certain embodiments, the force of gravity is negligible, since the forces exerted on the moving element by the bearing 150 and the electrostatic forces generated by the electrode or electrodes are many orders of magnitude larger than gravitational forces.

Figure 6:
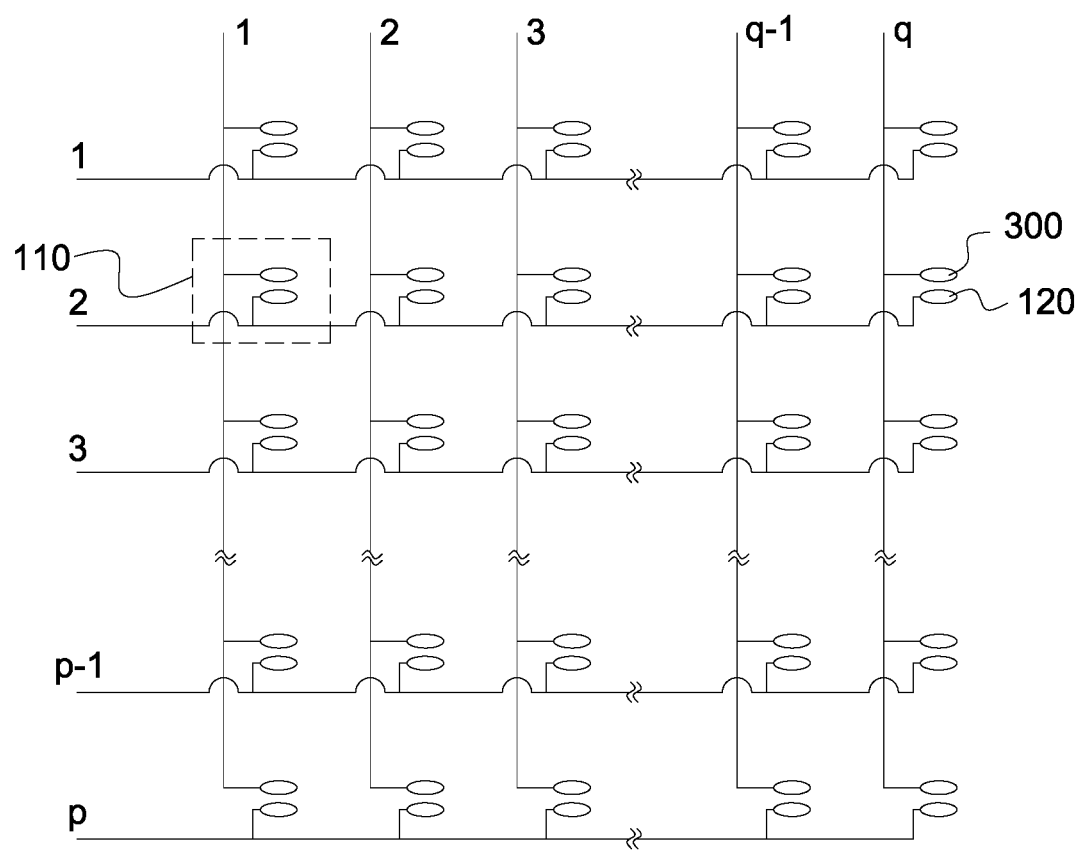
FIG. 6 is a simplified schematic diagram of an array of actuator elements (110), each comprising a moving element (120) and one electrode (300), with moving elements arranged in rows and electrodes arranged in columns.

FIG. 6 is a simplified schematic diagram of an actuator array comprising a plurality of one-sided actuator elements 110 arranged in rows and columns, the one-sided actuator elements being characterized in that each actuator element 110 has only one electrode 300. As shown, electrical connections between the actuator elements are typically such that moving elements 120 are electrically connected, say, along the columns of the array and electrodes 300 are electrically connected, say, along the rows of the array. The controller 50 of FIG. 1 (not shown here) is typically operatively associated with the array such that voltage may be applied between any selected row and column.

Figure 7:
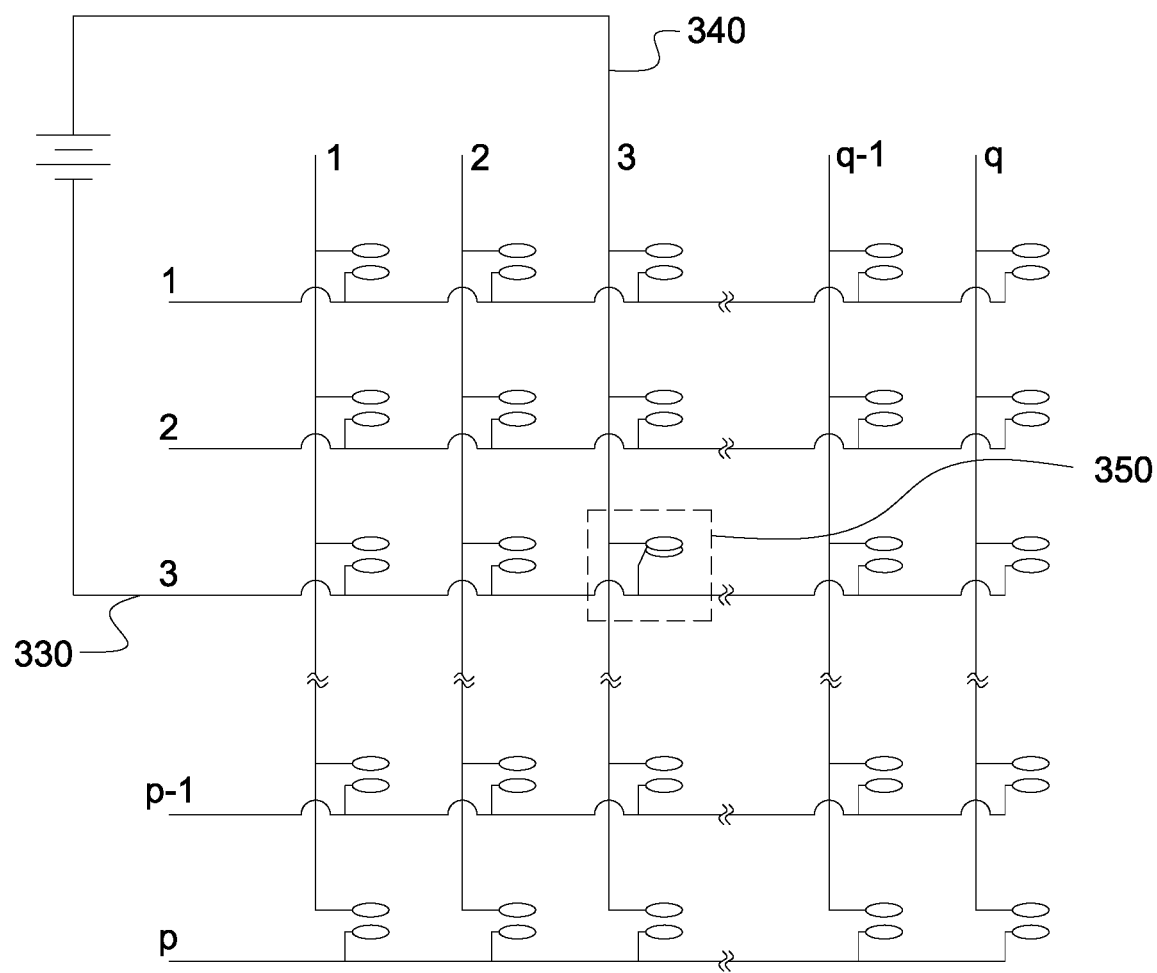
FIG. 7 shows the array of FIG. 6 with voltage applied between row i (330) and column j (340) to control the [i,j]'th moving element (350).

FIG. 7 shows the actuator device of FIG. 6 with voltage applied by the controller (not shown) between row 3 and column 3 which, as shown, results in the moving element 120 of the (3,3) actuator element moving toward the single electrode 300 of the actuator element (3,3) while all other actuator elements remain in their at-rest position.

Figure 8:
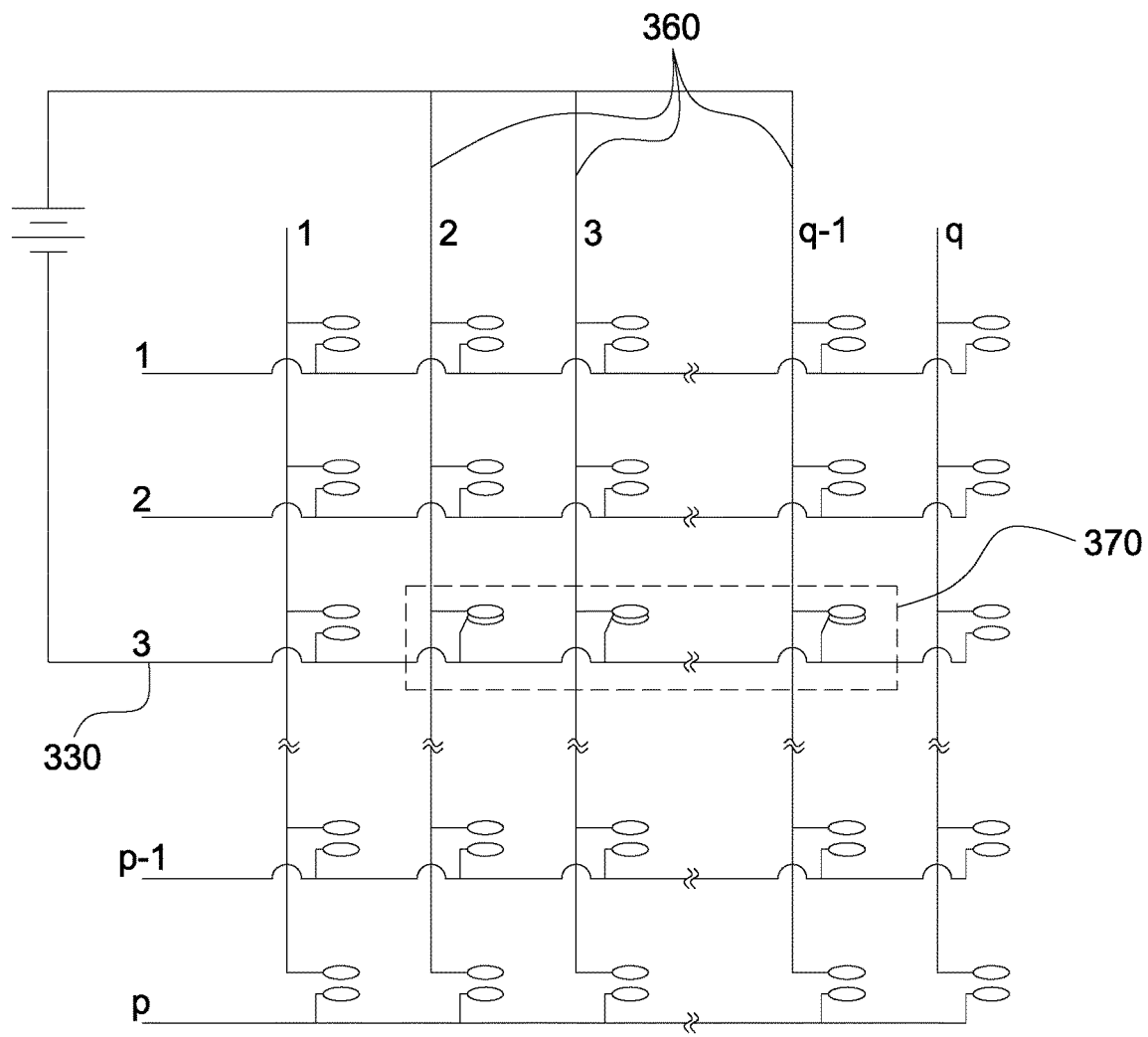
FIG. 8 shows the actuator device of FIG. 6 with voltage applied between row i (330) and several columns (360) to control several moving elements in row i (370).

FIG. 8 shows the actuator device of FIG. 6 with voltage applied by the controller (not shown) between row 3 and columns 2, 3, and (q−1), which, as shown, results in the moving elements 120 of the (3,2), (3,3) and (3,q−1) actuator elements moving respectively toward their corresponding single electrode 300 i.e. that of the actuator elements (3,2), (3,3) and (3,q−1) respectively, while all other actuator elements other than these 3, remain in their at-rest position.

Figure 9:
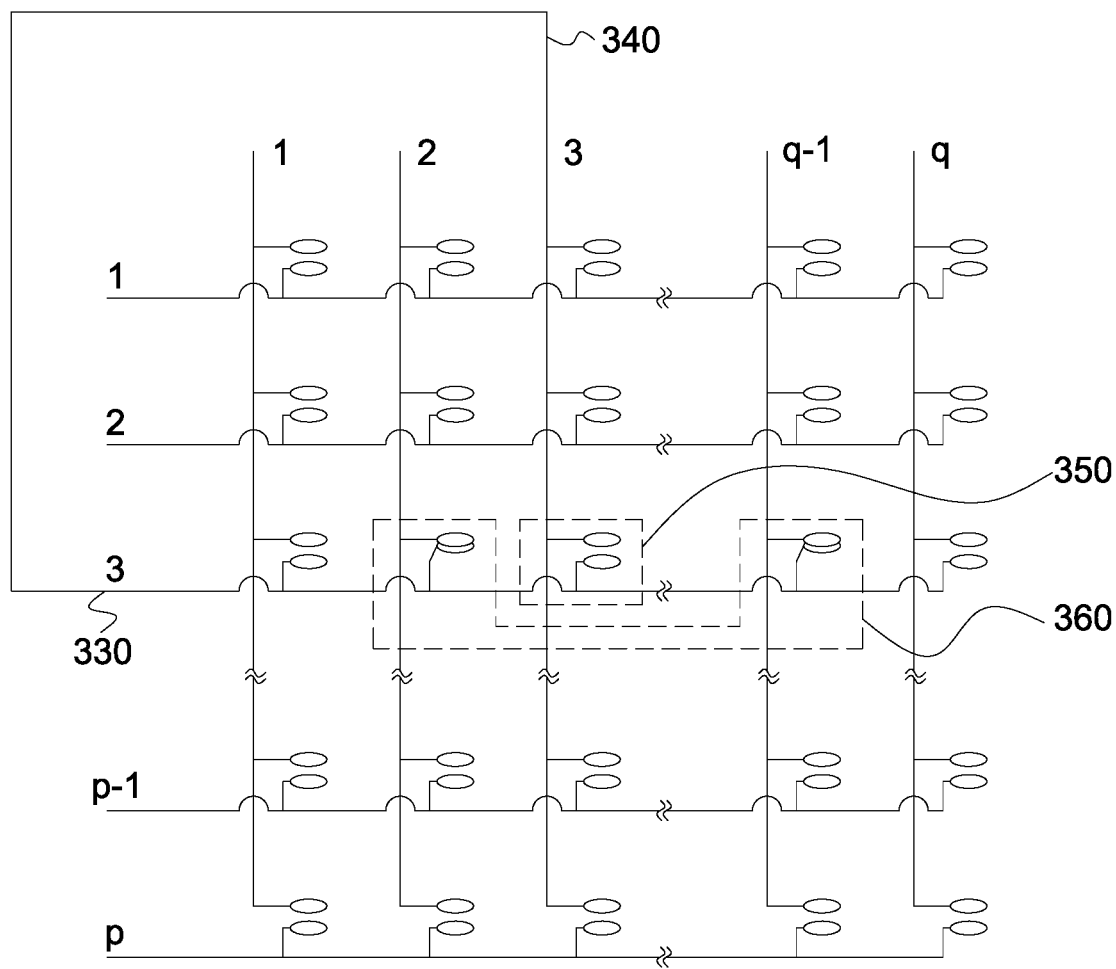
FIG. 9 shows the actuator device of FIG. 8 with row i (330) electrically connected to column j (340) to release the [i,j]'th moving element (350). Previously latched moving elements which are not electrically connected to their respective electrodes (380) remain latched.

FIG. 9 shows the actuator device of FIG. 8 after the third row has been shorted to the third column. As shown, actuator elements (3,2) and (3,q−1) remain in their previous positions, as shown in FIG. 8, because their circuits remain open such that electrical charge is maintained on these two actuator elements. Actuator element (3,3) however, returns to its at-rest position because the voltage between its electrode and its moving element, and hence the electro-static force acting upon this moving element, are now zero.

Figure 10:
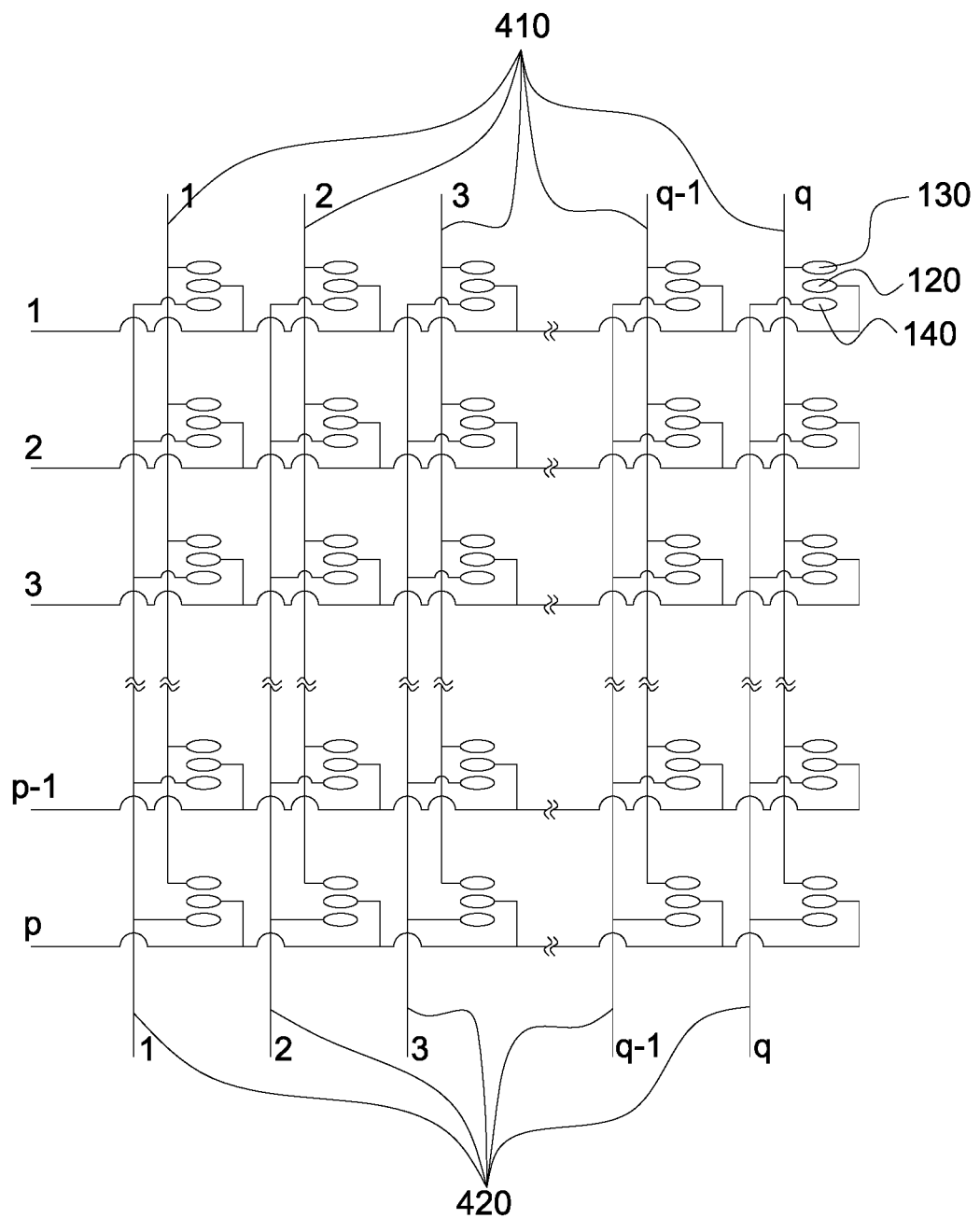
FIG. 10 is a simplified schematic diagram of an actuator device where each moving element has two electrodes, with moving elements (120) arranged in rows and top electrodes (130) and bottom electrodes (140) arranged in separate columns (410 and 420, respectively).

FIG. 10 is a simplified schematic diagram of an actuator array comprising a plurality of two-sided actuator elements 110 arranged in rows and columns, the two-sided actuator elements being characterized in that each actuator element 110 has a pair of electrodes 130 and 140. As shown, electrical connections between the actuator elements are typically such that: (a) moving elements 120 are electrically connected, say, along the rows of the array; (b) the first set of electrodes 130 are electrically connected, say, along a first set of columns 410 of the array; and (c.) the second set of electrodes 140 are electrically connected, say, along a second set of columns 420 of the array. The controller 50 (not shown) is typically operatively associated with the array such that voltage may be applied between any selected row and column.

Figure 11:
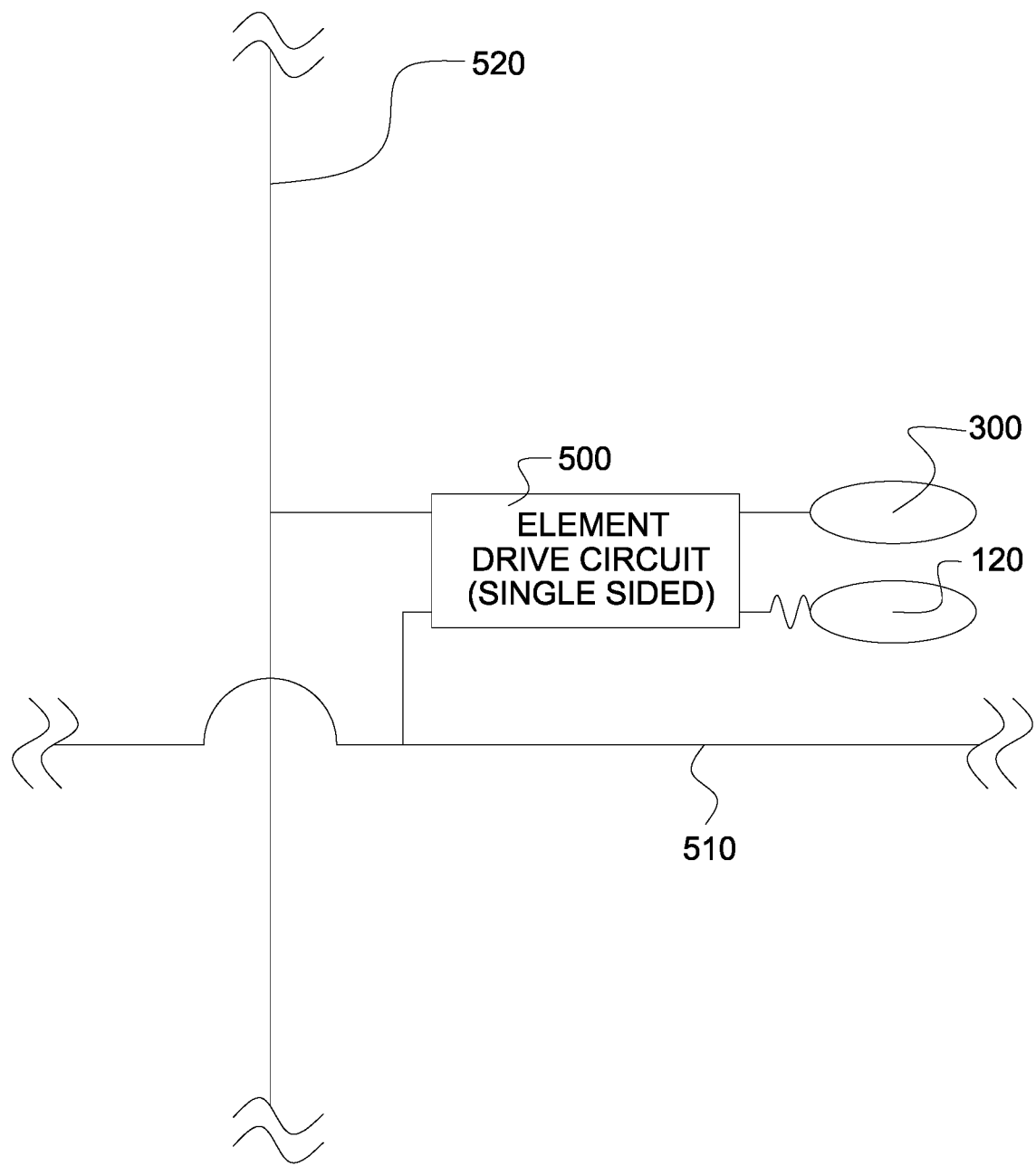
FIG. 11 is a simplified schematic diagram of a one-sided matrix array element, comprising a moving element (120) with a single electrode (300), and a one-sided element drive circuit (500) electrically connected to one row (510) and one column (520) of an array of actuator elements.

FIG. 11 is a simplified schematic diagram of a one-sided actuator element which is generally similar to an individual one of the actuator elements 110 of FIG. 6 except that a one-sided element drive circuit 500 is electrically connected to the row 510 and column 520 of the array to which the individual one-sided actuator element belongs. It is appreciated that one, some or all of the actuator elements of FIG. 11 may include an element drive circuit 500 as shown, or groups of elements may share a single drive circuit. The element drive circuit 500 may for example have a level shifting functionality allowing relatively high voltages, such as some tens of volts, to be applied between the electrode 300 and the moving element 120 under the control of low-voltage signals transmitted from the controller along the rows and columns to each element drive circuit within the array. Such high voltages may be useful for driving the actuator elements in accordance with the demands of the application.

A particular advantage of this embodiment is that the controller (not shown) may then comprise a purely low-voltage device operating at voltages commonly used for digital circuitry, such as 3.3 V, making the controller 50 more cost-effective to manufacture. Alternatively or in addition, the element drive circuit 500 may have a memory functionality which allows effective simultaneous control of more actuator elements than can physically be simultaneously addressed, because, by virtue of the memory functionality, actuator elements (i,j) can retain a position other than their at-rest position even when the element is no longer being addressed.

Figure 12:
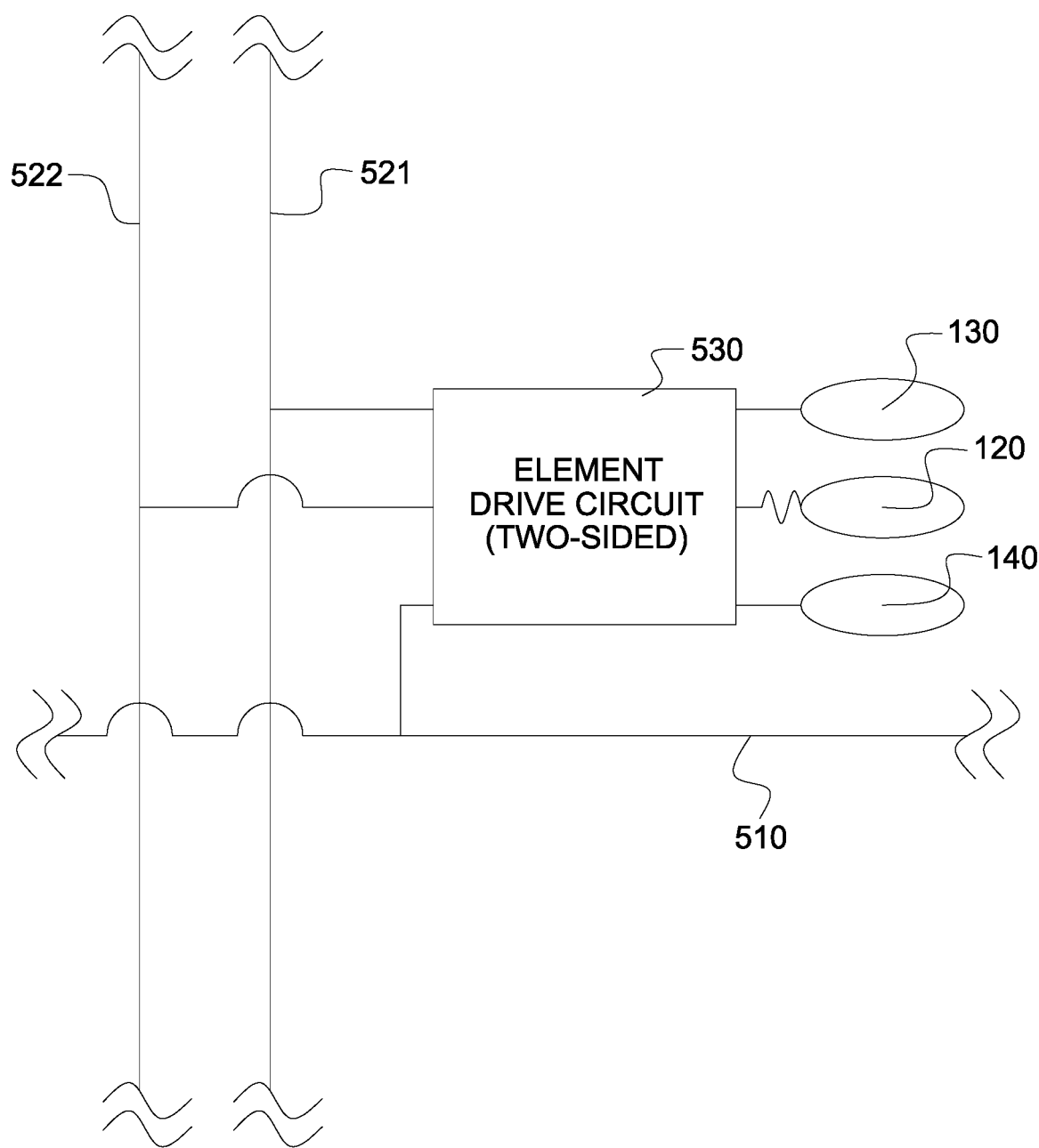
FIG. 12 is a simplified schematic diagram of an active, two-sided matrix array element, comprising a moving element (120) with two electrodes (130 and 140), and a two-sided element drive circuit (530) electrically connected to one row (510) and two columns (521 and 522) of an array of actuator elements, where each column controls one of the two electrodes.

FIG. 12 is a simplified schematic diagram of a two-sided actuator element (an actuator element having 2 electrodes) which is generally similar to an individual one of the actuator elements of FIG. 10 except that a two-sided element drive circuit 530 is electrically connected to the row 510 and columns 521 and 522 of the array to which the individual two-sided actuator element belongs. It is appreciated that one, some or all of the two-sided actuator elements of FIG. 10 may include an element drive circuit 530 as shown, or groups of elements may share a single drive circuit. The element drive circuit 530 controls the voltage applied between the moving element 120 and either electrode 130 and 140, and may have any or all of the functionalities described above with reference to the element drive circuit 500 of FIG. 11.

Figure 13:
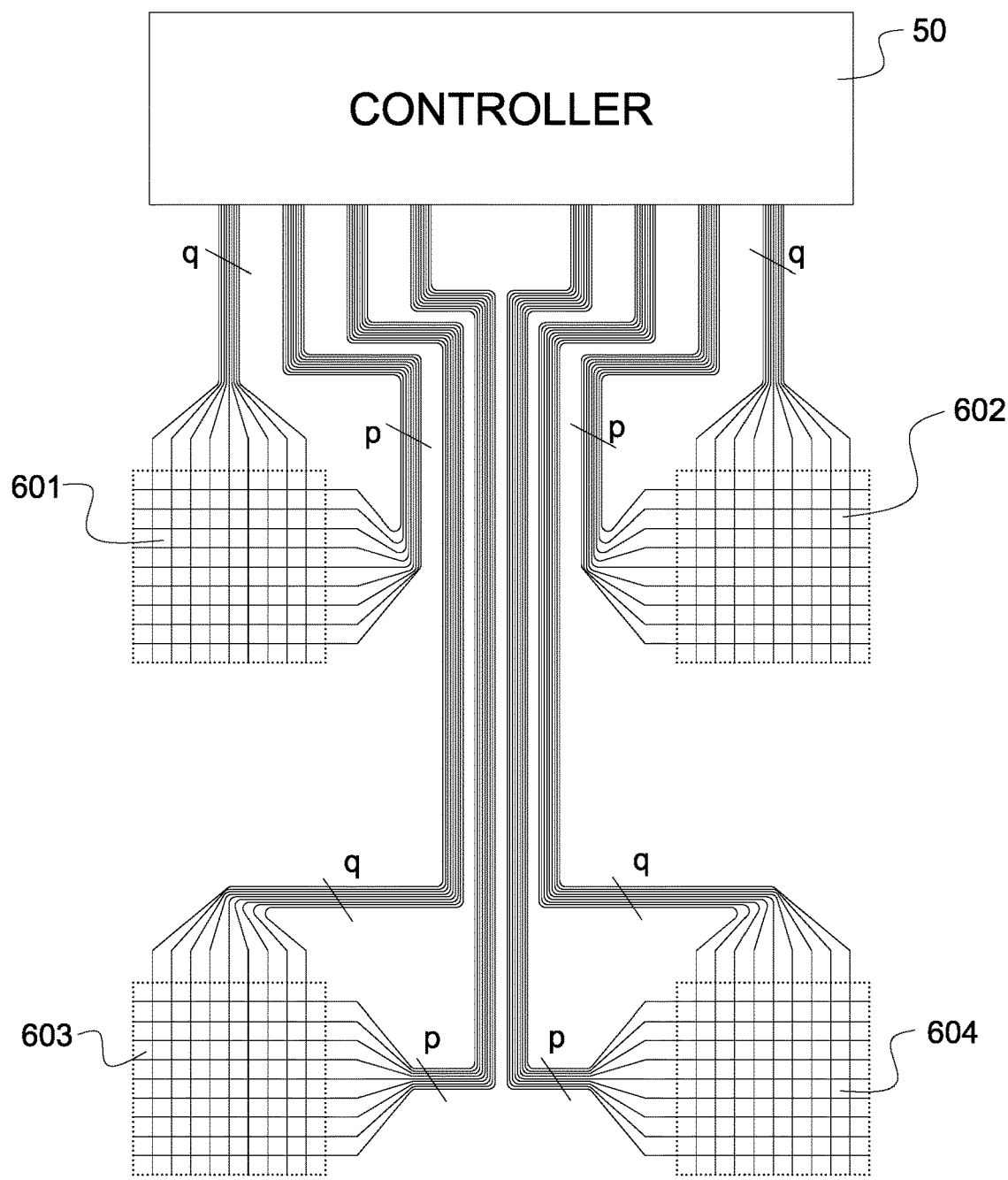
FIG. 13 is a simplified schematic diagram of an actuating device comprising multiple "sub-arrays" (601 to 604). Each sub-array typically comprises an array of actuator elements each having its own dedicated rows and columns but controlled by a single controller (50).

FIG. 13 is a simplified schematic diagram of the actuator apparatus of FIG. 1 in which multiple actuator arrays, such as n=4 arrays 601, 602, 603 and 604, of moving elements are provided, all controlled by a single controller 50. In particular, one electrical connection in the controller controls each of the p rows and each of the q columns of one array, and so on for each of the arrays, such that a total of n(p+q) electrical connections are provided in the controller for n arrays of p×q actuator elements. In the illustrated embodiment, n=4, p=q=9.

Figure 14:
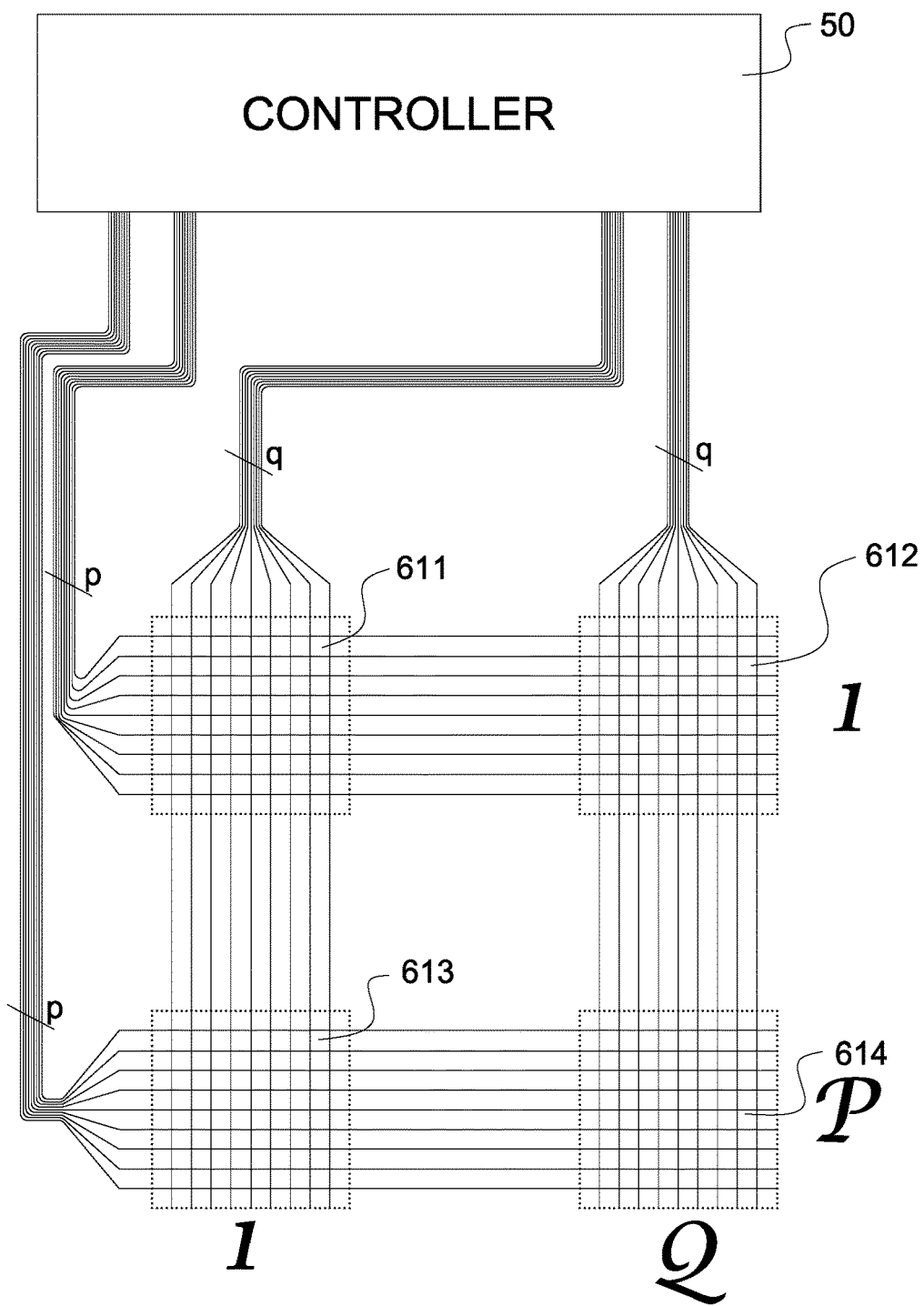

FIG. 14 is a simplified schematic diagram of the actuator apparatus of FIG. 1 in which multiple identical arrays, such as n=4 arrays 611, 612, 613 and 614, of moving elements are provided, all controlled by a single controller 50. However, in FIG. 14, as opposed to FIG. 13, the arrays are themselves arranged in an array, termed herein a P×Q "super-array" such that one electrical connection in the controller controls each of the p rows of all arrays in the first row of the super-array, one electrical connection in the controller controls each of the p rows of all arrays in the second row of the super-array, and so on, with one electrical connection in the controller controlling each of the p rows of all arrays in the last, P'th row of the super-array. Similarly, one electrical connection in the controller controls each of the q columns of all arrays in the first column of the super-array, one electrical connection in the controller controls each of the q columns of all arrays in the second column of the super-array, and so on, with one electrical connection in the controller controlling each of the q columns of all arrays in the last, Q'th column of the super-array. Typically a total of (P×p+Q×q) electrical connections are provided in the controller for a P×Q "super-array" of p×q actuator arrays. In the illustrated embodiment, n=4, p=q=9; P=Q=2.

Figure 15A:
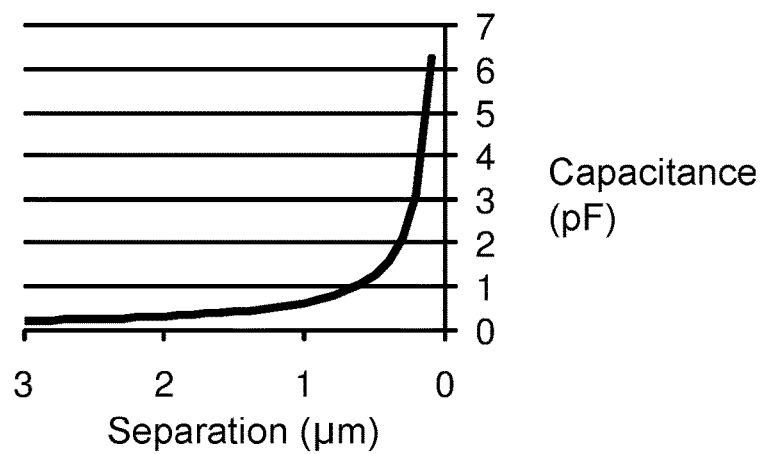
FIGS. 15A, 15B and 15C are graphs showing variation in the mutual capacitance between a moving element and an electrode, the voltage between them, the electrical charge stored in the mutual capacitance, and the resulting electrostatic force acting on the moving element, as a function of the separation distance between the moving element and the electrode in certain embodiments of the present invention.

FIG. 15A is a graph of the mutual capacitance between a moving element such as those described above with reference to FIGS. 1-14 and an electrode of an actuator element as a function of the separation distance between them. The particular values graphed relate to an example circular actuator element modelled as a parallel-plate capacitor with the moving element and electrode both having a diameter of 300 microns, and the dielectric being air.

Figure 15B:
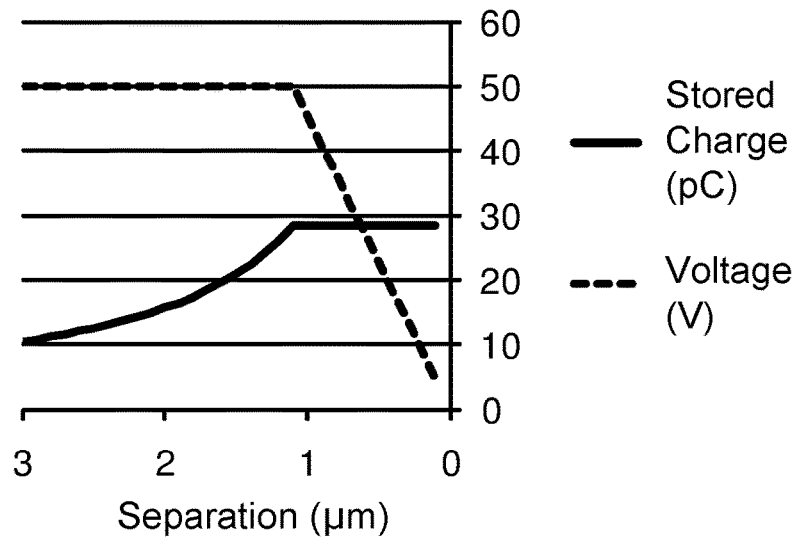

FIG. 15B shows the voltage across the parallel-plate capacitor of FIG. 15A, and the electrical charge stored on it, as a function of separation distance. In the illustrated example, initially, at a separation distance of 3 microns, the controller applies a voltage of 50V across the capacitor. The separation then decreases over time. After the separation distance reaches 1 micron, the controller opens the electrical connection to the electrode or the moving element such that charge can no longer enter or leave the capacitor. From this point onwards, the voltage between the moving element and the electrode decreases as separation distance decreases.

Figure 15C:
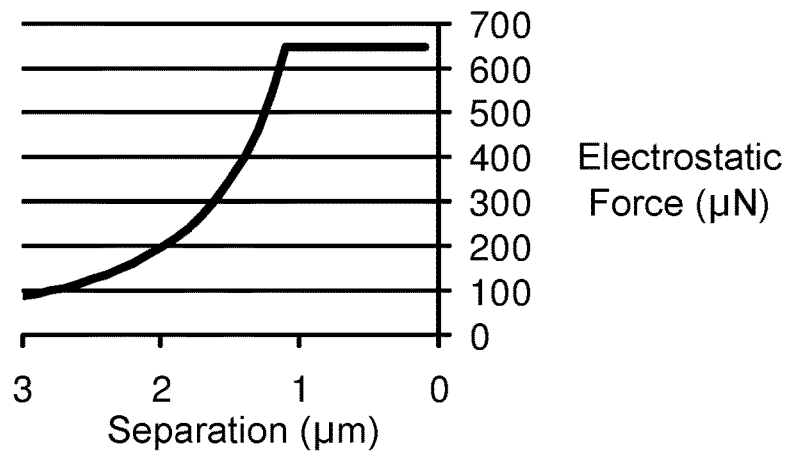

FIG. 15C shows the electrostatic force acting on the moving element of FIGS. 15A and 15B, as a function of its separation distance from the electrode. Initially, with a constant voltage applied between the electrode and and the moving element, the electrostatic force increases as separation distance decreases. However, after the controller opens the electrical connection, the electrostatic force remains constant as separation distance decreases further.

Figure 16A:
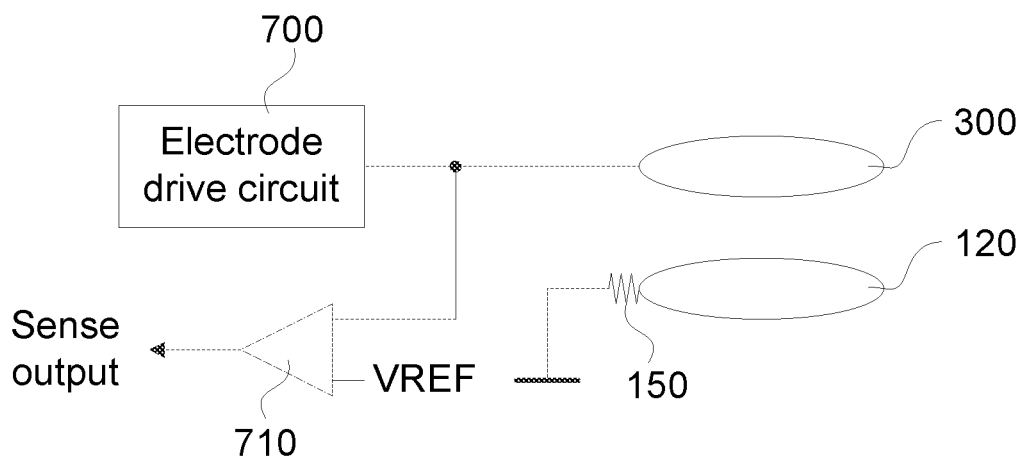
FIGS. 16A and 16B are simplified schematic diagrams of a one-sided actuator element incorporating certain types of voltage sensors (710 and 720) to provide certain information about the position of the moving element (120) relative to the electrode (300).
Figure 16B:
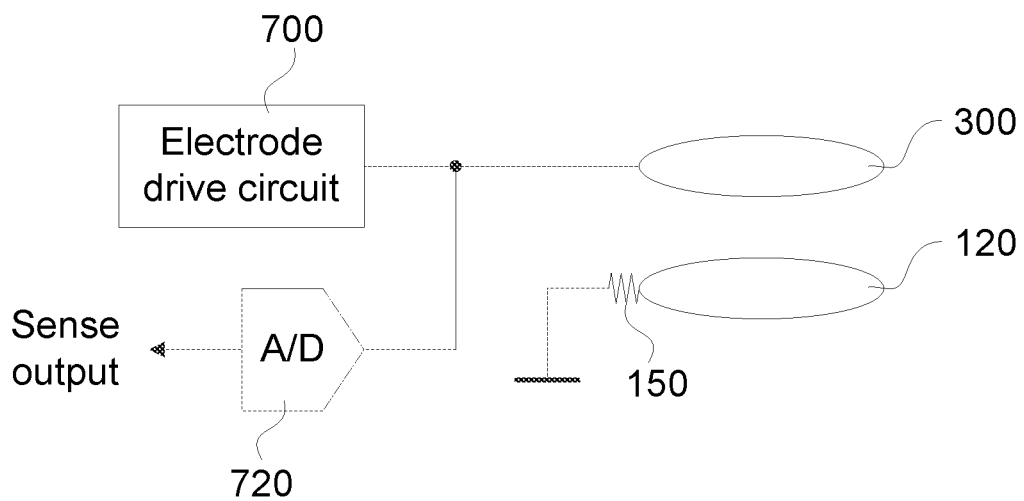

FIGS. 16A and 16B are simplified schematic diagrams of one-sided actuator elements incorporating a voltage sensor. An electrode drive circuit (700) is provided which may be part of the controller shown in FIG. 1 or may be identical with the one-sided element drive circuit 500 of FIG. 11. Electrode drive circuit (700) initially charges the capacitor formed by the electrode (300) and the moving element (120) to a non-zero voltage, and subsequently disconnects at least one of the moving element or the electrode thereby preventing any transfer of electrical charge into or out of the capacitor. Any movement of the moving element (120) towards or away from the electrode (300) then causes the voltage on the capacitor to decrease or increase, respectively. A voltage sensor can detect this change in voltage, providing information about the position of the moving element (120).

In FIG. 16A, the voltage sensor is an analog comparator (710) whose sense output comprises a binary signal indicating whether the voltage between the electrode and the moving element is higher or lower than a reference voltage.

In FIG. 16B, the voltage sensor is an analog-to-digital converter (720) whose sense output comprises a multi-level rather than binary, typically numeric representation of the voltage between the electrode and the moving element.

Figure 17:
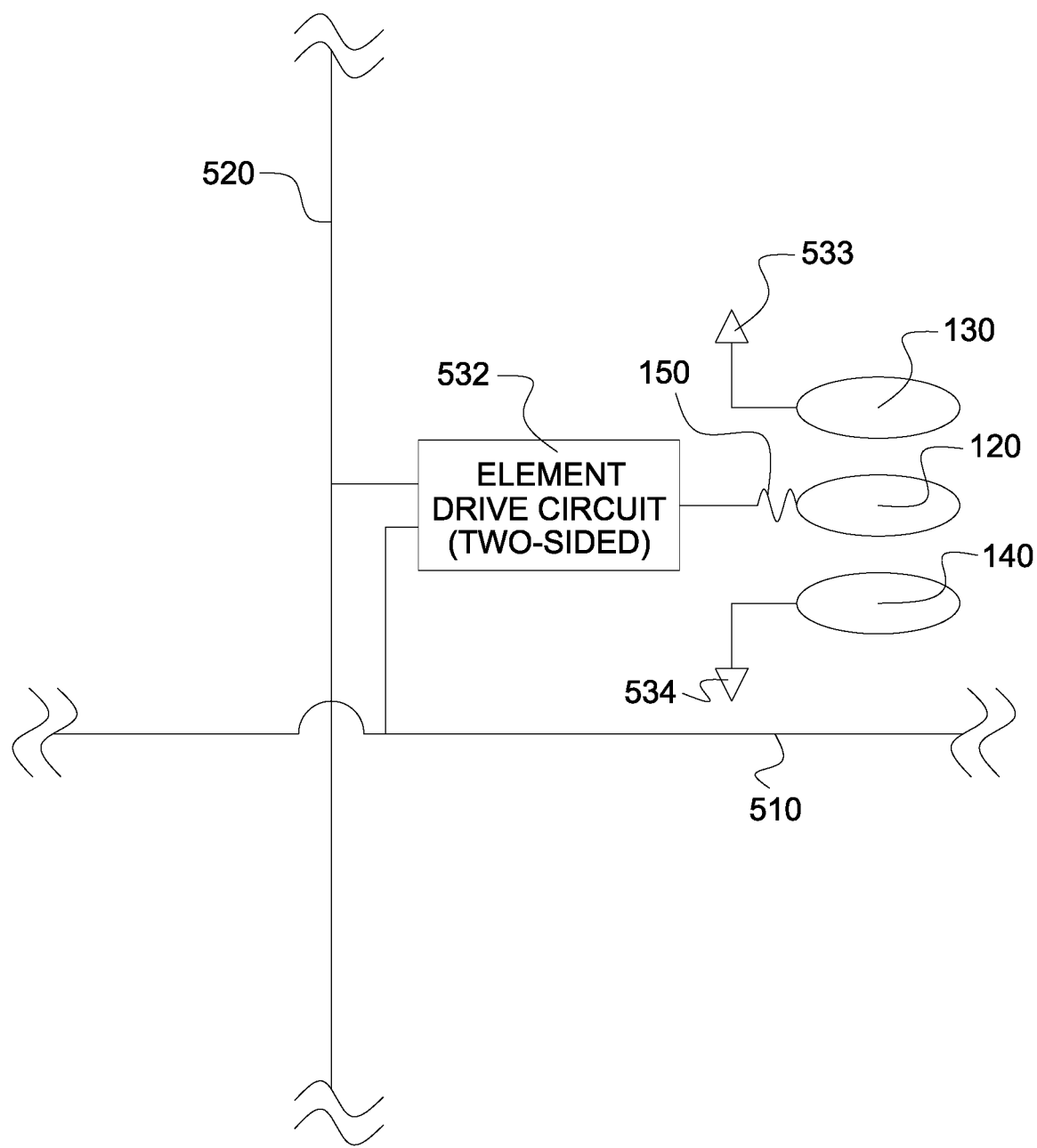
FIG. 17 is a simplified schematic diagram of a two-sided actuator element with in an element drive circuit, in an array where electrodes are shared between actuator elements.

FIG. 17 is a simplified schematic diagram of a two-sided actuator element having an element drive circuit 532, in an array where electrodes are shared between actuator elements. The first electrode 130 is connected to a first electric potential 533, the second electrode 140 is connected to a second electric potential 534, and the element drive circuit 532 has only a single output electrically connected to the moving element 120.

According to certain embodiments, the voltage between the top electrode and the bottom electrode is substantially constant during normal operation, or changes at a rate that is orders of magnitude lower than the actuation clock frequency. The element drive circuit 532 may, for example, contain a digital CMOS push-pull output stage capable of connecting the moving element 120 to either the first electric potential 533 or the second electric potential 534. When the moving element 120 is connected to the first electric potential 533, the voltage between it and the first electrode 130 is zero and the voltage between the moving element 120 and the second electrode 140 is non-zero, creating an electrostatic force that attracts the moving element 120 towards the second electrode 140. Likewise, when the moving element 120 is connected to the second electric potential 534, the voltage between it and the second electrode 140 is zero and the voltage between the moving element 120 and the first electrode 130 is non-zero, creating an electrostatic force that attracts the moving element 120 towards the first electrode 130.

One-sided actuator elements such as those shown in FIG. 5 or FIG. 11 may alternatively be constructed with electrodes shared between actuator elements. The element drive circuit 532 may be implemented using technologies other than CMOS, such as but not limited to bipolar transistors. The output of the element drive circuit may be continuously variable rather than being restricted to two levels as described above. The output of the element drive circuit may have a high-impedance state (known in the art as "tri-state" or "hi-Z"), allowing it to prevent any transfer of electrical charge into or out of the pair of parallel-plate capacitors formed by the moving element 120 and the two electrodes, as described above with reference to FIG. 15B.

Figure 18:
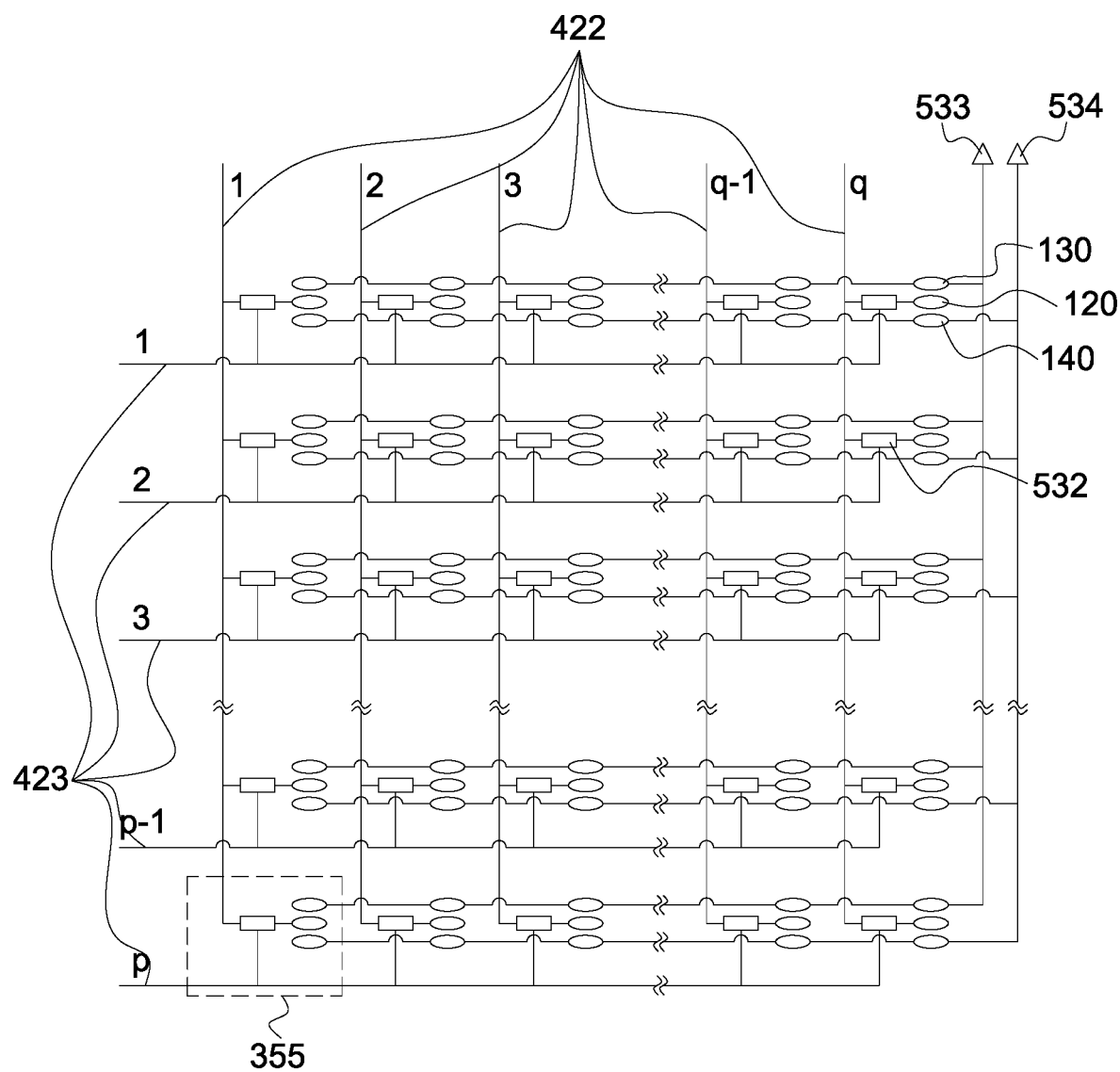
FIG. 18 is a simplified schematic diagram of an actuator array comprising a plurality of the two-sided actuator elements described above with reference to FIG. 17.

FIG. 18 is a simplified schematic diagram of an actuator array comprising a plurality of the two-sided actuator elements described above with reference to FIG. 17. According to certain embodiments, the first electrode 130 of each actuator element is electrically connected to the first electrode of every other actuator element, and to a first electric potential 533; and likewise, the second electrode 140 of each actuator element is electrically connected to the second electrode of every other actuator element, and to a second electric potential 534.

A particular advantage of the embodiment of FIG. 18 is that no electrical insulation is required between any of the first electrodes or any of the second electrodes; whereas the actuator arrays shown in FIGS. 6 and 10, or arrays of actuator elements such as those shown in FIGS. 11 and 12, do include electrical insulation between the electrodes of each actuator element. Hence, all the electrodes of FIG. 18 can be implemented as two continuous layers of electrically conductive material, such as doped silicon or aluminium, disposed on either side of the moving elements 120, without any need to divide these layers into electrically insulated areas. This allows for a simpler and more effective manufacturing process.

Control algorithms suitable for implementing the controllers shown and described herein such as controller 50 of FIG. 1, are now described. Generally, the controller typically controls the position of each moving element in said actuator device as a function of the digital input signal sampled in accordance with a sampling clock. According to one embodiment of the present invention, the range of the digital input signal may be such that the number of values the signal can assume equals the number of actuator elements in the apparatus, and the sampling clock is of the same frequency as the actuation clock. In this case, the controller may implement an algorithm in which each data word of the digital input signal directly determines the number of moving elements in a certain position.

For example, in an apparatus using one-sided actuator elements, the algorithm may latch or release individual moving elements such that the number of latched moving elements in the apparatus always equals the number represented by the last (most recently received) data word of the digital input signal received by the controller. Alternatively, the algorithm may be such that the number of unlatched moving elements equals the last data word received. In embodiments with two-sided actuator elements, the algorithm may be such that the number of moving elements latched into their first extreme position, or alternatively the number of moving elements latched into their second extreme position, equals the last data word received. Alternatively, the controller may implement an algorithm where each data word of the digital input signal determines a number of actuator elements to be moved (e.g. raised or lowered) along their respective axes.

Other control algorithms may also take account of the actuator elements' impulse response in order to more accurately reproduce the digital input signal. Control algorithms may also include additional signal processing functions such as but not limited to volume and tone control as described in Applicants' co-pending application WO2007/135679, entitled "Volume And Tone Control In Direct Digital Speakers". In general, the number of values that the digital input signal assumes may differ from the number of actuator elements in the apparatus, and therefore the controller may include a scaling function to match the digital input signal to the number of actuator elements available. Likewise, the sampling clock may differ from the actuation clock, and therefore the controller may include a re-sampling, sample rate conversion, interpolation or decimation function to match the sampling clock to the actuation clock.

Where the number of actuator elements in the apparatus is lower than the number of values that the digital input signal can take and the actuation clock frequency is higher than the sampling clock frequency, known techniques such as oversampling, noise shaping, and sigma-delta modulation may be used to minimise the effect of quantization noise and to increase the effective resolution of the actuator device. In this connection reference is made to the above-referenced publications by M. Hawksford.

Depending on the application, various different criteria may be used in selecting which specific moving elements are latched or released at a given time. For example, the controller may select moving elements occupying particular positions in the actuator device, in order to create a desired directivity pattern as described in applicants' co-pending application WO2007/135678 ("Direct digital speaker apparatus having a desired directivity pattern"). Alternatively, the controller may select moving elements in a pseudo-random fashion such as to minimise the effect of element mismatch (known term). Yet another option is for the controller to select moving elements in such a way as to simplify the control algorithm. These or any other selection criteria may also be combined.

The controller may incorporate an industry standard interface to receive said digital input signal, such as but not limited to an I2S, AC'97, HDA, or SLIMbus interface (all these are known terms and may be trademarks).

The moving elements and electrode or electrodes are typically fabricated from an electrically conductive material, such as doped monocrystalline silicon, doped polycristalline silicon, or aluminum, or at least contain an electrically conductive layer. Spacing layers between moving elements and electrodes are typically fabricated from an electrically insulating material, such as silicon dioxide, or at least contain an electrically insulating layer. Bearings are typically fabricated from a material capable of elastic deformation without plastic deformation, such as monocrystalline silicon, polycrystalline silicon, or aliminum, such that bearings do not retain any permaneent deformation in the absence of electrostatic forces, and moving elements always return to the exact same at-rest position when no electrostatic force is applied.

Cost-effective mass production of the actuator devices described herein may for example be achieved as follows: Wafers such as silicon or aluminum wafers or SOI (silicon on insulator) wafers, of industry standard dimenstions such as 6-inch or 8-inch diameter, may be used as a substrate for the fabrication of large numbers of actuator devices in existing microfabrication plants (known in the art as "fabs"). Depending on the desired size of the actuator device and the wafer size, a single wafer may have sufficient surface area to accommodate tens, hundreds or more actuator devices. Alternatively, if a large actuator device is desired, then the actuator device may be designed to fill the entire surface of a single wafer. Still larger actuator devices may be constructed by combining several large actuator arrays, each filling an entire wafer, into a single apparatus e.g. as described with reference to FIGS. 13 and 14. Wafers may be processed in industry standard batch sizes of, for example, twenty-five wafers at a time, using existing fab equipment designed for such batch sizes.

The manufacturing process for actuator devices typically comprises a sequence of process steps, resulting in fully formed actuator devices. Each of the process steps follows a technique known in the semiconductor or MEMS industry, for which suitable equipment is commercially available, such as (but not limited to): photolithography, etching, thermal oxidation, chemical vapor deposition, trench isolation, ion implantation, and diffusion. Typically, each process step creates a certain feature for all actuator elements of all actuator devices on the same wafer at the same time, in a single step. For example, all bearings of all actuator elements on the wafer may be formed in a single etching process; all electrodes on the wafer may be doped in a single ion implantation or diffusion process to improve their electrical conductivity; and/or all electrodes or all moving elements on the wafer may be electrically isolated from each other in a single trench isolation step.

Cost-effective mass production of the controller described herein may be achieved by implementing the controller as an application-specific integrated circuit (ASIC—well known term), using industry standard technology such as, for example, CMOS. Alternatively or in addition, existing, off-the-shelf electronic components may be used to implement some or all parts of the controller. Such electronic components may include (but are not limited to): integrated circuits, such as (but not limited to) FPGAs, CPLDs, DSPs or microprocessors (all known terms); discrete components, such as MOSFETs, bipolar transistors, diodes, or passives; or any combination of integrated circuits and discrete components. Certain parts of the controller may also be implemented in software rather than as hardwired electronic circuits. Such software parts may be executed by any suitable engine such as (but not limited to) a microprocessor, microcontroller or DSP, and may be written in any suitable programming language including: native machine code, any high-level programming language such as (but not limited to) C, C++, or Perl, any modeling language such as (but not limited to) MATLAB, or any hardware description language such as (but not limited to) Verilog or VHDL.

Forming an entire apparatus including a controller and an actuating device may include fabrication as a single die on the same wafer. Depending on desired size of the actuator device, the size of the controller and the wafer size, a single wafer may accommodate many such apparatuses or only a single such apparatus. Alternatively, parts of the controller may be fabricated as part of the same die as the associated actuator device, with other parts fabricated as a separate integrated circuit, built from existing, off-the-shelf electronic components, or implemented in software, or any combination thereof. Where some or all parts of the controller are fabricated as an integrated circuit separately from the actuator device, the two separate fabrication processes of the controller and the actuator device respectively may differ in process flow, process geometry, number of process steps, number of masks or any other feature. This allows each fabrication process to be optimised separately to achieve, for example, lowest overall cost, smallest size, highest yield (known term), or any other desired property.

It is appreciated that terminology such as "mandatory", "required", "need" and "must" refer to implementation choices made within the context of a particular implementation or application described herewithin for clarity and are not intended to be limiting since in an alternative implantation, the same elements might be defined as not mandatory and not required or might even be eliminated altogether.

It is appreciated that certain functionalities described herein e.g. moving element control functionalities, may if desired be implemented in software.

Features of the present invention which are described in the context of separate embodiments may also be provided in combination in a single embodiment. Conversely, features of the invention, including method steps, which are described for brevity in the context of a single embodiment or in a certain order may be provided separately or in any suitable subcombination or in a different order. "e.g." is used herein in the sense of a specific example which is not intended to be limiting. It is appreciated that in the description and drawings shown and described herein, functionalities described or illustrated as systems and sub-units thereof can also be provided as methods and steps therewithin, and functionalities described or illustrated as methods and steps therewithin can also be provided as systems and sub-units thereof. The scale used to illustrate various elements in the drawings is merely exemplary and/or appropriate for clarity of presentation and is not intended to be limiting.

The invention claimed is:

1. A passive matrix apparatus comprising:
a plurality of N two-sided actuator elements arranged in $N_r$ rows and $N_c$ columns, wherein:
each of the N two-sided actuator elements is indicated by a pair of numbers (i, j), where:

$N=N_r \times N_c$;

i is a row number belonging to an interval from 1 to $N_r$; and
j is a column number belonging to an interval from 1 to $N_c$;
each of the N two-sided actuator elements including:
an electroconductive moving element;
a pair of electroconductive electrodes, including a top electrode and a bottom electrode, correspondingly, disposed on opposite sides of the electroconductive moving element so that application of a voltage between the electroconductive moving element and at least one of said top electrode and said bottom electrode generates a force driving said electroconductive moving element away from an at-rest position towards at least one of the top electrode and the bottom electrode, correspondingly; and a spring, characterized by a certain elasticity to:
restrict motion of said electroconductive moving element from said at-rest position towards at least one of the top electrode and the bottom electrode, thereby allowing for said electroconductive moving element to reach at least one of the top electrode and the bottom electrode, only when the voltage applied between the electroconductive moving element and at least one of said top electrode and said bottom electrode, correspondingly, is sufficiently high;
allow motion of said electroconductive moving element from at least one of the top electrode and the bottom electrode towards said at-rest position, only when the voltage applied between the electroconductive moving element and at least one of said top electrode and said bottom electrode, correspondingly, is sufficiently low; and
prevent motion of said electroconductive moving element, when said electroconductive moving element is in a position latched adjacent to at least one of the top electrode and the bottom electrode and while the voltage, applied between the electroconductive moving element and at least one of said top electrode and said bottom electrode, correspondingly, is intermediate being at most equal to said sufficiently high voltage and higher than said sufficiently low voltage; and
three sets of mutually electro-isolated electrical connections, including:
a set of row-oriented conductors,
a set of top column-oriented conductors, and
a set of bottom column-oriented conductors, correspondingly,
wherein:
the electrical connections are designed to be capable of receiving electric potentials controlled by an external controller; and
the electrical connections between the two-sided actuator elements being such that:
the top electrodes of the two-sided actuators belonging to the j-th column of said passive matrix apparatus are electrically connected to a common top column-oriented conductor, indicated as the j-th top electrical conductor for each of the 1 to $N_c$ columns;
the bottom electrodes of the two-sided actuators belonging to the j-th column of said passive matrix apparatus are electrically connected to a common bottom column-oriented conductor, indicated as the j-th bottom electrical conductor for each of the 1 to $N_c$ columns;
the electroconductive moving elements of the two-sided actuators belonging to the i-th row of said passive matrix apparatus are electrically connected to a common row-oriented conductor, indicated as the i-th electrical conductor for each of the 1 to $N_r$ rows;
wherein, when the passive matrix apparatus is manipulated by:
a tuple of said electric potentials, indicated by P(i), with i being a row number belonging to interval from 1 to $N_r$, wherein P(i) is applied to said i-th electrical conductor,
a tuple of said electric potentials, indicated by $P_{top}(j)$, with j being a column number belonging to interval from 1 to $N_c$, wherein $P_{top}(j)$ is applied to said j-th top electrical conductor, and
a tuple of said electric potentials, indicated by $P_{bottom}(j)$, with j being a column number belonging to interval from 1 to $N_c$, wherein $P_{bottom}(j)$ is applied to said j-th bottom electrical conductor;

the passive matrix apparatus provides a degree of freedom to establish a specific voltage, being at least one of said sufficiently high voltage, said intermediate voltage, and said sufficiently low voltage, determined by difference $|P_{top}(j)-P(i)|$ or $P_{bottom}(j)-P(i)|$ between the electroconductive moving element and either said top electrode or said bottom electrode, correspondingly, of the (i, j)-th two-sided actuator element, to provide a required position of the electroconductive moving element of the (i, j)-th two-sided actuator element without changing positions of the electroconductive moving elements of all others (N−1) two-sided actuator elements.

2. The passive matrix apparatus according to claim 1, further comprising a position sensor sensing the position of said electroconductive moving element of the (i, j)-th two-sided actuator element along said axis.

3. The passive matrix apparatus according to claim 2, wherein the position sensor comprises a capacitance sensor.

4. The passive matrix apparatus according to claim 2, wherein if said position sensor detects that an electroconductive moving element has an aberrant moving pattern, the controller marks the electroconductive moving elements as faulty and ignores said electroconductive moving element in further use of said passive matrix apparatus.

5. The passive matrix apparatus of claim 1, wherein the electroconductive moving element is mechanically connected to stationary portions of the two-sided actuator element by the spring, the spring defining an axis along which the electroconductive moving element can travel, preventing the electoconductive moving element from travelling in other directions and defining said at-rest position of the electroconductive moving element.

* * * * *